(12) United States Patent
Chang et al.

(10) Patent No.: US 9,035,894 B2
(45) Date of Patent: May 19, 2015

(54) TOUCH SENSING AND FEEDBACK APPARATUSES AND METHODS

(71) Applicant: INDUSTRIAL TECHNOLOGY RESEARCH INSTITUTE, Hsinchu (TW)

(72) Inventors: Chih-Chia Chang, Zhubei (TW); Chen-Pang Kung, Zhongli (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 175 days.

(21) Appl. No.: 13/749,303

(22) Filed: Jan. 24, 2013

(65) Prior Publication Data

US 2014/0204034 A1 Jul. 24, 2014

(51) Int. Cl.
*G06F 3/041* (2006.01)

(52) U.S. Cl.
CPC ..................................... *G06F 3/041* (2013.01)

(58) Field of Classification Search
USPC .......................................... 345/173–176, 156
See application file for complete search history.

(56) References Cited

U.S. PATENT DOCUMENTS

| | | | |
|---|---|---|---|
| 8,766,924 B2* | 7/2014 | Yamauchi et al. | 345/173 |
| 8,791,800 B2* | 7/2014 | Ryhanen et al. | 340/407.2 |
| 2008/0150934 A1* | 6/2008 | Ozaki et al. | 345/214 |
| 2009/0079550 A1* | 3/2009 | Makinen et al. | 340/407.2 |
| 2009/0243632 A1* | 10/2009 | Ozawa | 324/679 |
| 2010/0085169 A1* | 4/2010 | Poupyrev et al. | 340/407.2 |
| 2010/0085325 A1* | 4/2010 | King-Smith et al. | 345/174 |
| 2011/0037707 A1* | 2/2011 | Radivojevic et al. | 345/173 |
| 2011/0043477 A1* | 2/2011 | Park et al. | 345/174 |
| 2011/0079449 A1* | 4/2011 | Radivojevic | 178/18.03 |
| 2011/0127880 A1* | 6/2011 | Murphy et al. | 310/317 |
| 2011/0286156 A1* | 11/2011 | Beecher et al. | 361/679.01 |
| 2012/0038559 A1* | 2/2012 | Radivojevic et al. | 345/173 |
| 2012/0062516 A1* | 3/2012 | Chen et al. | 345/174 |
| 2014/0049505 A1* | 2/2014 | Radivojevic et al. | 345/174 |

OTHER PUBLICATIONS

Yamamoto et al., Electrostatic Tactile Display With Thin Film Slider and Its Application to Tactile Telepresentation Systems, IEEE Transactions on Visualization and Computer Graphics, vol. 12, No. 2. Mar./Apr. 2006, pp. 168-177.

Kaczmarek et al., Polarity Effect in Electrovibration for Tactile Display, IEEE Transactions on Biomedical Engineering, vol. 53, No. 10, Oct. 2006, pp. 2047-2054.

(Continued)

*Primary Examiner* — Grant Sitta
(74) *Attorney, Agent, or Firm* — Finnegan, Henderson, Farabow, Garrett & Dunner LLP

(57) ABSTRACT

A touch sensing and feedback apparatus comprises a feedback electrode, a reference electrode electrically insulated from the feedback electrode, a signal generator to generate a sensing driving signal and transmit the sensing driving signal to a sensing electrode, and a signal detector coupled to a detecting electrode to detect the sensing driving signal and generate a touch action signal based on the detected sensing driving signal. The signal generator generates a feedback driving signal and transmits the feedback driving signal to the feedback electrode based on the touch action signal, and generates a reference driving signal and transmits the reference driving signal to the reference electrode based on the touch action signal. The reference driving signal maintains the reference electrode electrically-grounded.

19 Claims, 24 Drawing Sheets

(56) References Cited

OTHER PUBLICATIONS

Forlines et al., Evaluating Tactile Feedback and Direct vs. Indirect Stylus Input in Pointing and Crossing Selection Tasks, CHI 2008 Proceedings—Tactile and Haptic User Interfaces, Apr. 5-10, 2008, Florence, Italy, pp. 1563-1572.

Israr et al., Frequency and Amplitude Discrimination Along the Kinesthetic-Cutaneous Continuum in the Presence of Masking Stimuli, J. Acoust. Soc. Am., 120 (5), Nov. 2005, pp. 2789-2800.

Brewster et al., Tactile Feedback for Mobile Interactions, CHI 2007 Proceedings, Mobile Interaction, Apr. 23-May 3, 2007, San Jose, CA, pp. 159-162.

Harrison et al., Providing Dynamically Changeable Physical Buttons on a Visual Display, CHI 2009, Clicking on Buttons, Apr. 6, 2009, Boston, MA, pp. 299-303.

* cited by examiner

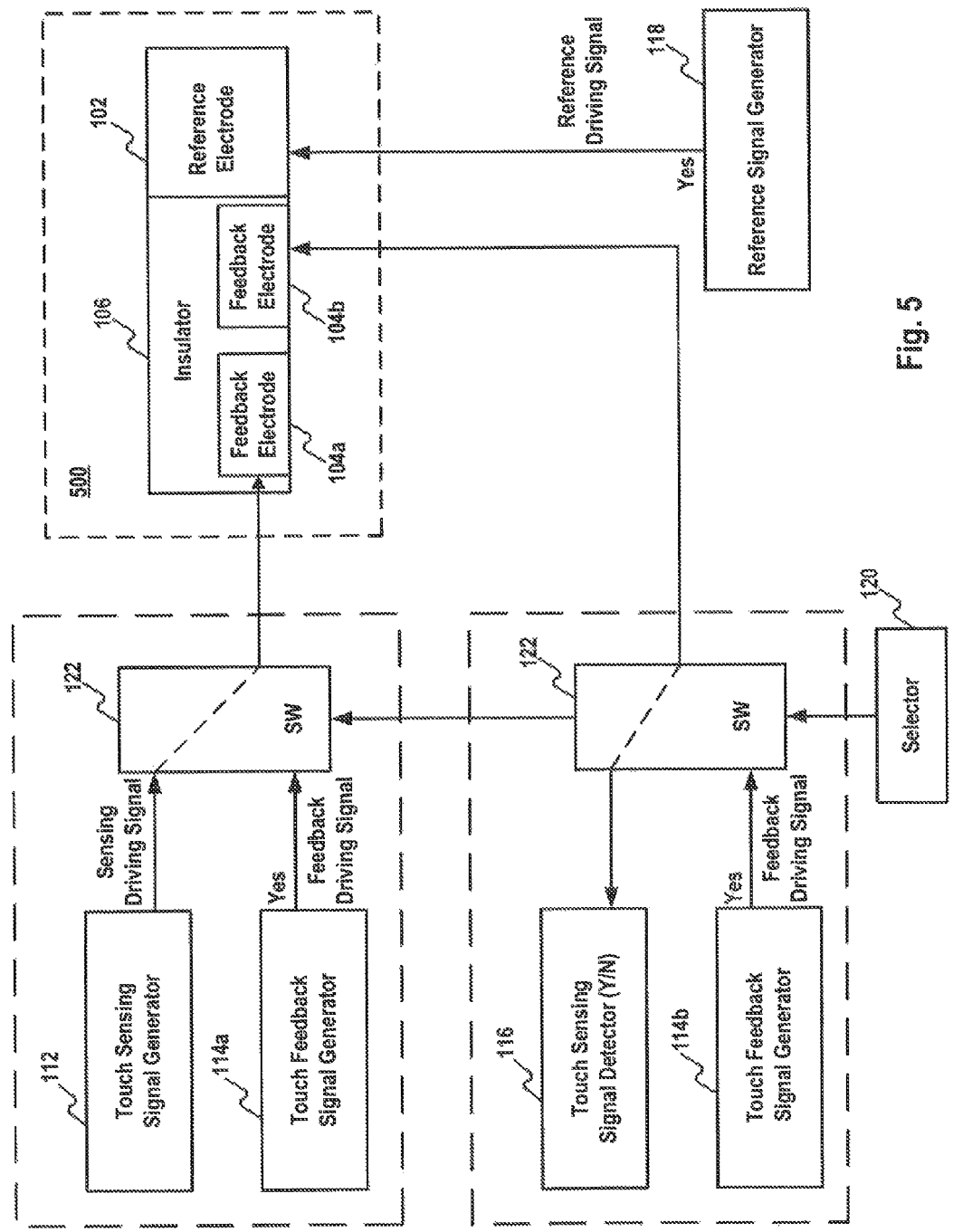

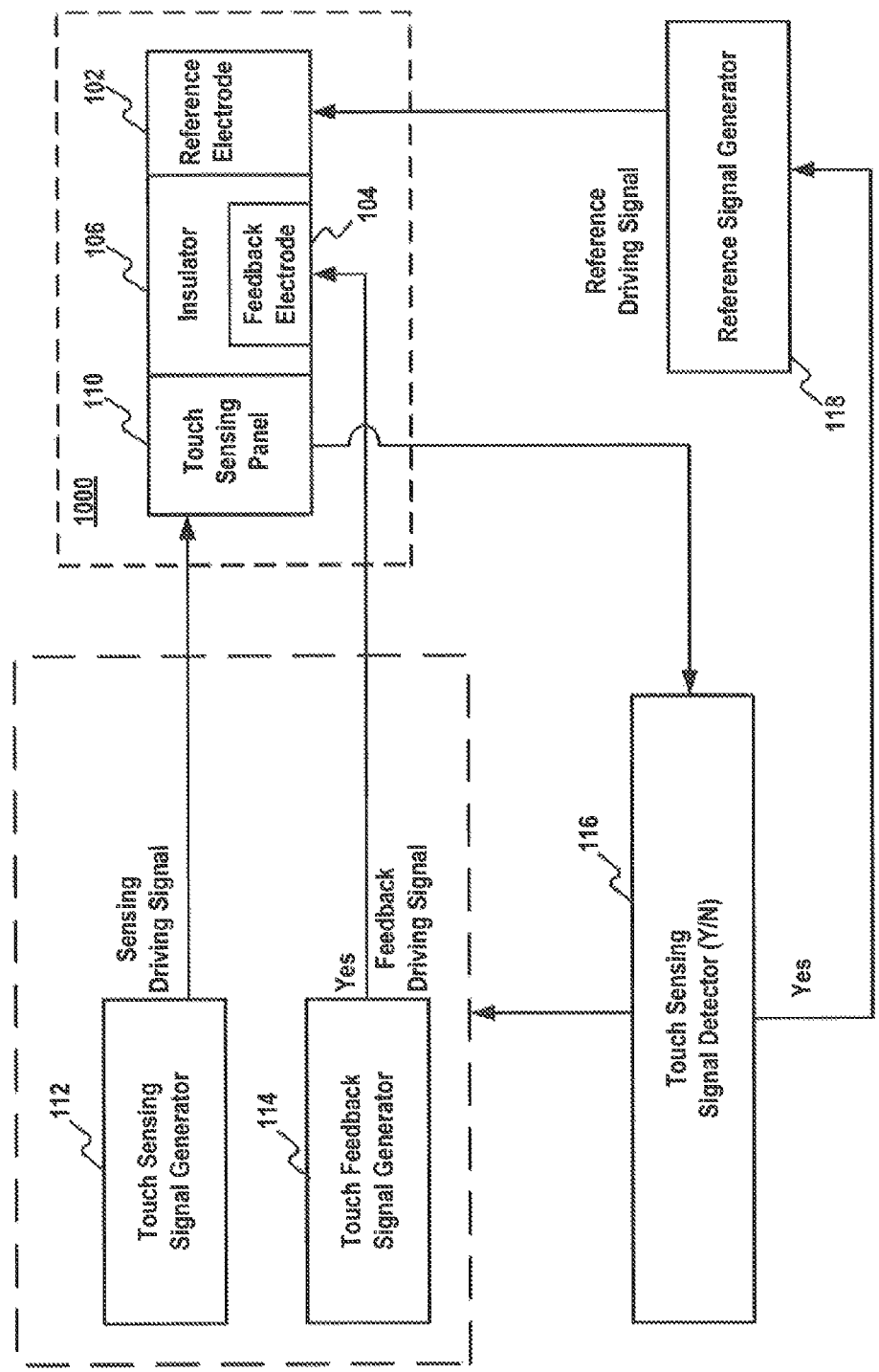

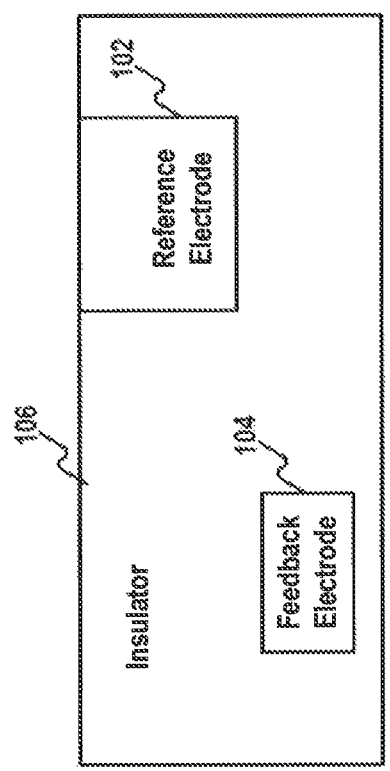

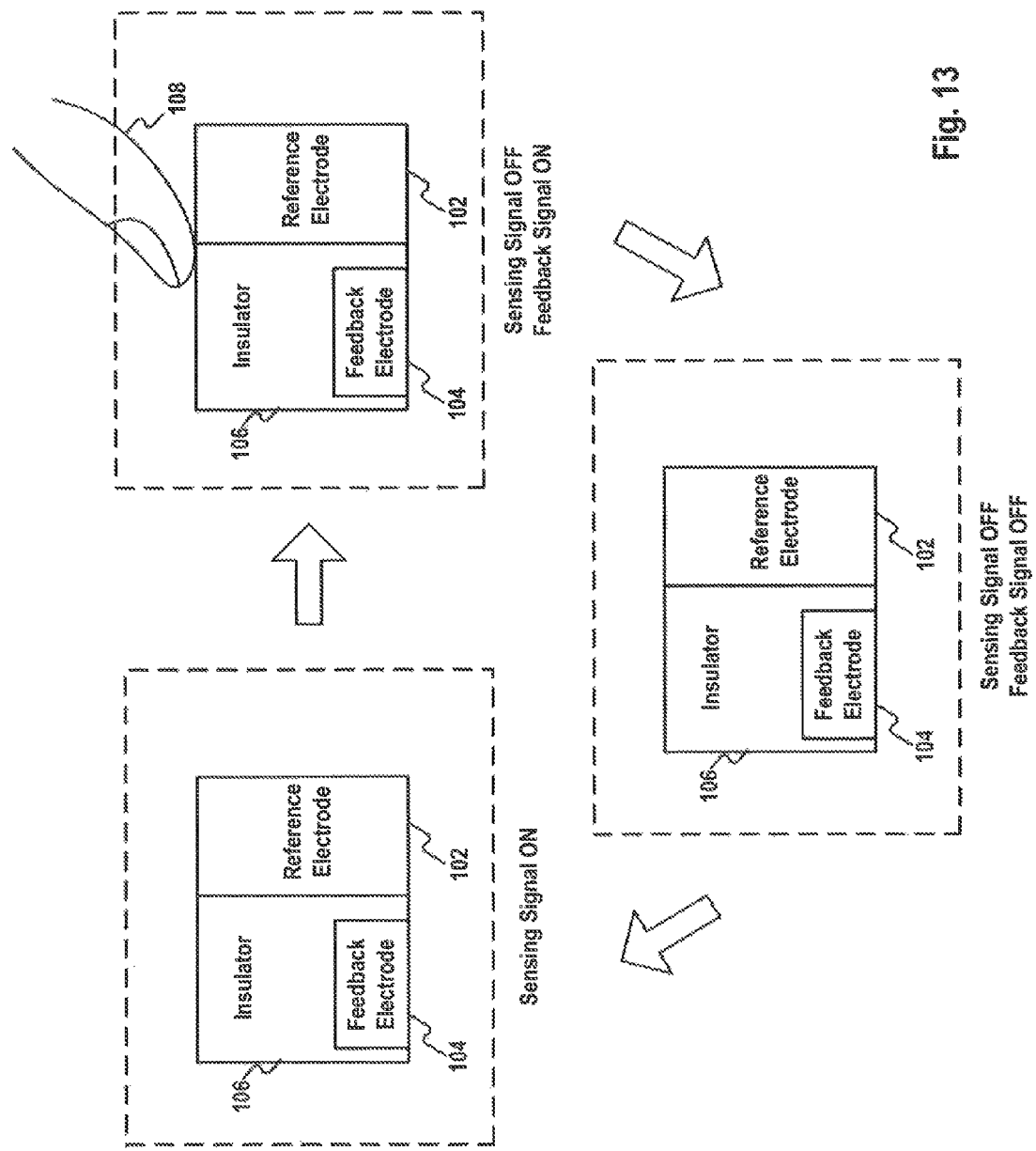

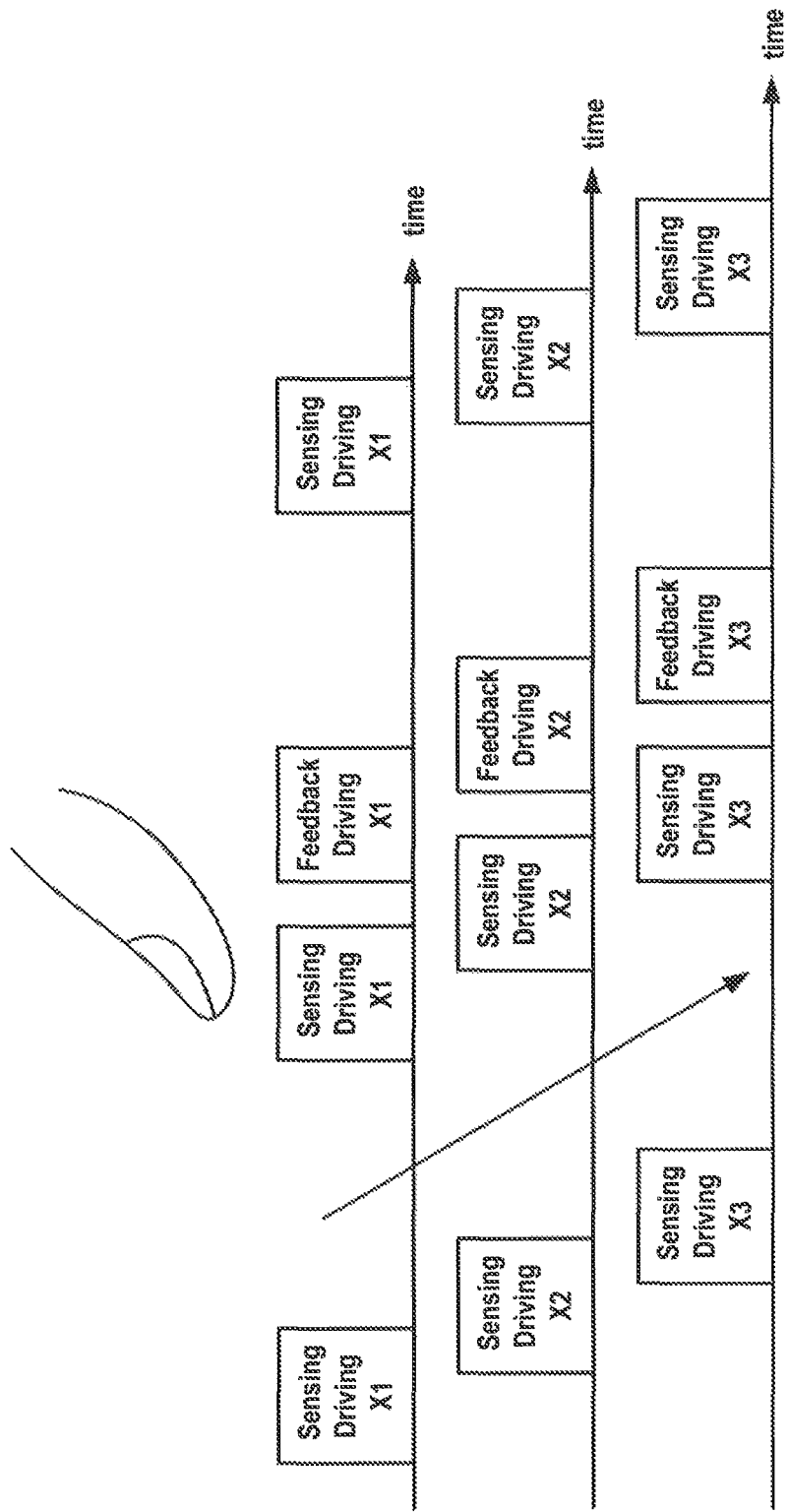

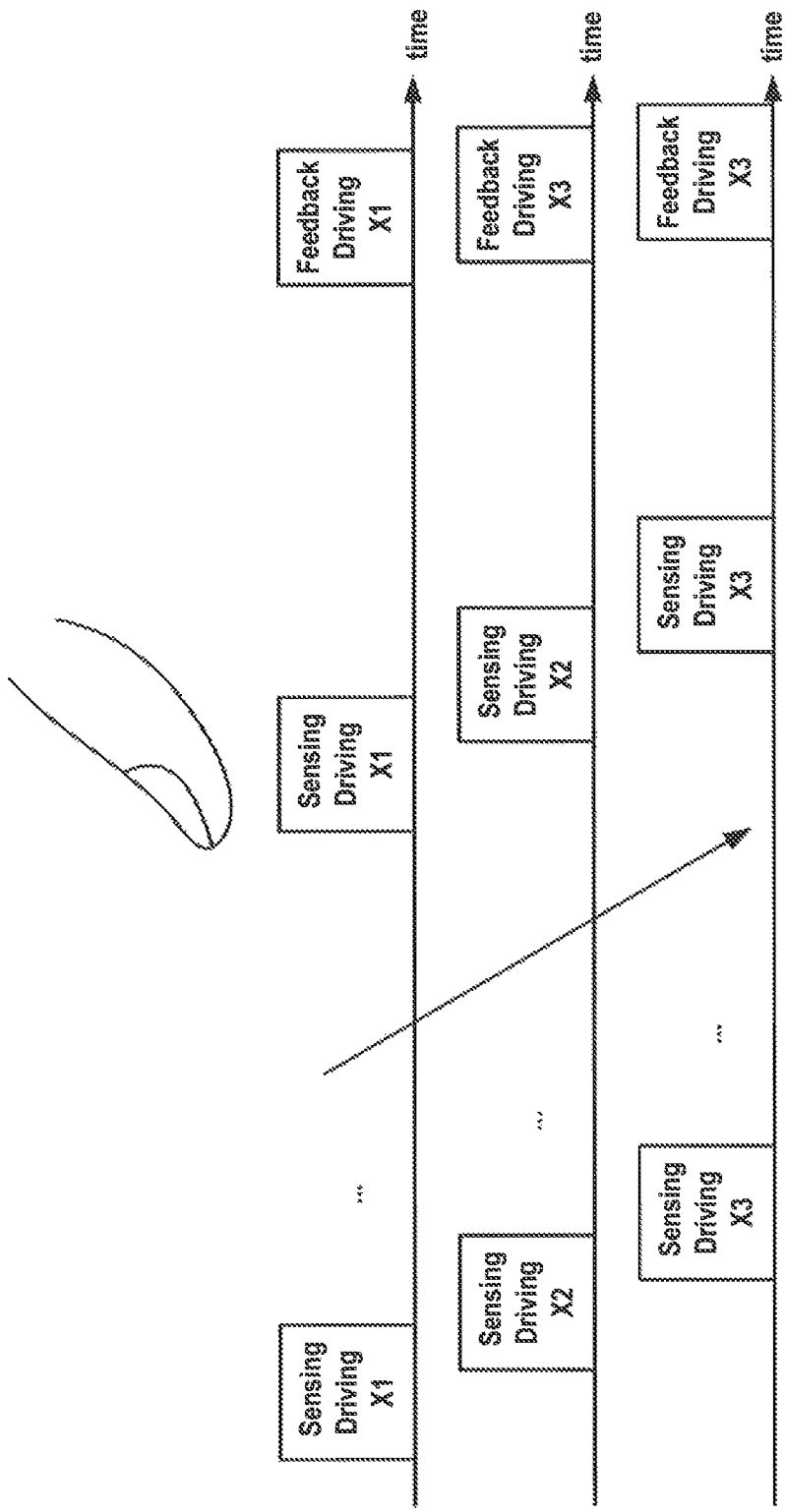

TOUCH SENSING AND FEEDBACK APPARATUSES AND METHODS

TECHNICAL FIELD

The present disclosure relates to touch sensing and feedback apparatuses and methods. The present disclosure relates to touch sensing and touch feedback, their implementations, and their application in integrated devices.

BACKGROUND

Touch input has been used in various applications, such as user-input or user interaction devices for portable electronics, machines, equipment, vehicles, etc. It may be desirable to have an apparatus or method that may integrate both touch sensing and touch feedback functionalities or provide adequate feedback intensity.

SUMMARY

In one embodiment, there may be provided a touch sensing and feedback apparatus. The touch sensing and feedback apparatus may comprise: a feedback electrode; a reference electrode electrically insulated from the feedback electrode; a signal generator to generate a sensing driving signal and transmit the sensing driving signal to a sensing electrode, the sensing electrode being consist of at least a portion of one of the feedback electrode and the reference electrode; and a signal detector coupled to a detecting electrode to detect the sensing driving signal and generate a touch action signal based on the detected sensing driving signal, the detecting electrode being consist of at least a portion of one of the feedback electrode and the reference electrode. The signal generator may generate a feedback driving signal and transmits the feedback driving signal to the feedback electrode based on the touch action signal; and generates a reference driving signal and transmits the reference driving signal to the reference electrode based on the touch action signal. The reference driving signal maintains the reference electrode in an electrically-grounded condition.

In another embodiment, there may be provided a touch sensing and feedback panel. The touch sensing and feedback panel may comprise a plurality of touch sensing and feedback units arranged in a two-dimensional array. Each touch sensing and feedback unit may comprise a feedback electrode and a reference electrode electrically insulated from the feedback electrode. The touch sensing and feedback panel may also comprise a signal generator to generate a sensing driving signal and transmit the sensing driving signal to each of the touch sensing and feedback units; a signal detector coupled to each of the touch sensing and feedback units to detect the sensing driving signal and generate, for each of the touch sensing and feedback units, a touch action signal based on the detected sensing driving signal; and a controller coupled to the signal generator and the signal detector to determine one or more touch sensing and feedback units of the plurality that are touched based on the touch action signal. The controller may control the signal generator to generates a feedback driving signal and transmits the feedback driving signal to the feedback electrode of the one or more touch sensing and feedback units that are touched, and generates a reference driving signal and transmits the reference driving signal to the reference electrode of the one or more touch sensing and feedback units that are touched. The reference driving signal may be configured to maintain the reference electrode in an electrically grounding condition.

In another embodiment, there may be provided a method for touch sensing and feedback control. The method comprises: generating a sensing driving signal and transmitting the sensing driving signal to a sensing electrode of a touch sensing and feedback apparatus; detecting the sensing driving signal at a detecting electrode of the touch sensing and feedback apparatus; generating a touch action signal based on the detected sensing driving signal; generating a feedback driving signal and transmitting the feedback driving signal to a feedback electrode of the touch sensing and feedback apparatus based on the touch action signal; and generating a reference driving signal and transmitting the reference driving signal to a reference electrode of the touch sensing and feedback apparatus based on the touch action signal to maintain the reference electrode in an electrically grounding condition, wherein the reference electrode is electrically insulated from the feedback electrode.

In another embodiment, there may be provided a method for controlling a touch sensing and feedback panel, wherein the touch sensing and feedback panel comprises a plurality of touch sensing and feedback units. The method comprises: generating a sequence of sensing driving signals and transmitting the sensing driving signals sequentially to the plurality of touch sensing and feedback units, wherein each touch sensing and feedback unit receives one sensing driving signal in the sequence; detecting, for each of the touch sensing and feedback units, the corresponding sensing driving signal and generating a touch action signal based on the detected sensing driving signal; determining one or more touch sensing and feedback units of the plurality that are touched based on the touch action signal; generating a feedback driving signal and transmitting the feedback driving signal to a feedback electrode of the one or more touch sensing and feedback units that are touched; and generating a reference driving signal and transmitting the reference driving signal to a reference electrode of the one or more touch sensing and feedback units that are touched to maintain the reference electrode in an electrically grounding condition.

The preceding summary and the following detailed description are exemplary only and do not limit of the scope of the claims.

BRIEF DESCRIPTION OF THE DRAWINGS

The accompanying drawings, which are incorporated in and constitute a part of this specification, in connection with the description, illustrate various embodiments and exemplary aspects of the disclosed embodiments. In the drawings:

FIGS. 5-10 are schematic diagrams illustrating various exemplary touch sensing and feedback apparatuses, consistent with some disclosed embodiments;

FIG. 11 is a schematic diagram illustrating an exemplary touch sensing and feedback apparatus, consistent with some disclosed embodiments;

FIG. 13 is a schematic diagram illustrating exemplary operation stages of a touch sensing and feedback apparatus, consistent with some disclosed embodiments;

FIGS. 15A and 15B are signal sequences illustrating an exemplary method of applying sensing driving signals, feedback driving signals, and reference driving signals, consistent with some disclosed embodiments;

FIGS. 17A and 17B are signal sequences illustrating yet another exemplary method of applying sensing driving signals, feedback driving signals, and reference driving signals, consistent with some disclosed embodiments;

DESCRIPTION OF EXEMPLARY EMBODIMENTS

Reference will now be illustrated in detail to exemplary embodiments, examples of which are illustrated in the accompanying drawings. When appropriate, the same reference numbers are used throughout the drawings to refer to the same or like parts.

Embodiments of the present disclosure may involve touch sensing and feedback apparatuses and methods for touch sensing and feedback control. The term "touch sensing and feedback" may refer to any technique of implementing both touch sensing and touch feedback functionalities in an integrated device. Touch sensing may include detecting a touch action on a surface of a touch sensitive device. A touch action may be performed by a user using his/her finger(s) or a conductive medium such as a stylus. A touch action may include contact touch, e.g., when a user's finger(s)/conductive medium contacts the surface of a touch sensitive device; and non-contract touch, e.g., when the user's finger(s)/conductive medium is close to or almost contacts the surface of a touch sensitive device. In some embodiments, a touch action may be detected through detecting a change of capacitance due to the performance of the touch action. A touch sensitive device may refer to any device capable of sensing (e.g., detecting) a touch action. Touch feedback may refer to an electrical feedback to a user's finger(s) (directly or through a conductive medium) to cause tactile sensation due to electrical charges exchanging. In some embodiments, touch feedback may be achieved through an electrical signal having predetermined voltage and frequency. A touch sensing and feedback apparatus or device may refer to an apparatus or device integrating both touch sensing and touch feedback functionalities.

Figure 1A:
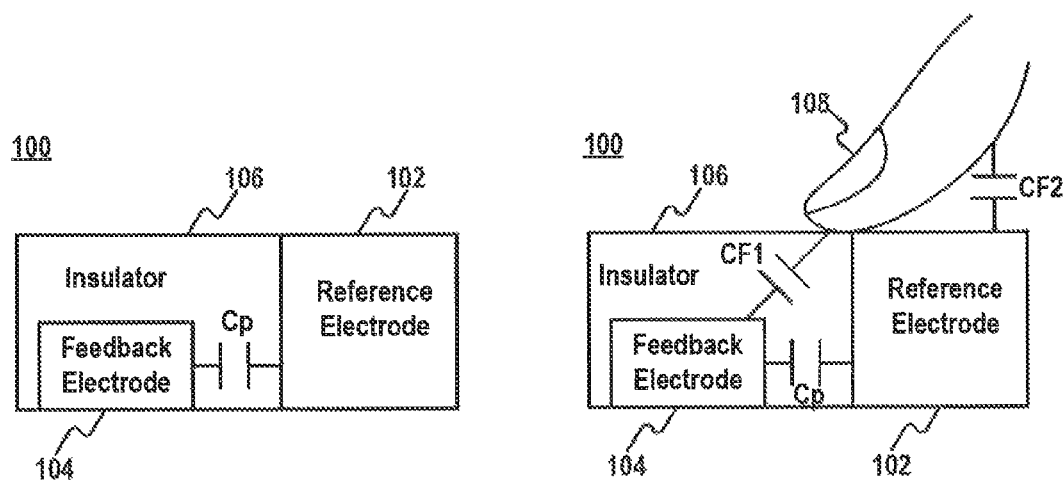
FIG. 1A is a schematic diagram illustrating an exemplary touch sensing and feedback apparatus in a sensing stage, consistent with some disclosed embodiments.
Figure 1B:
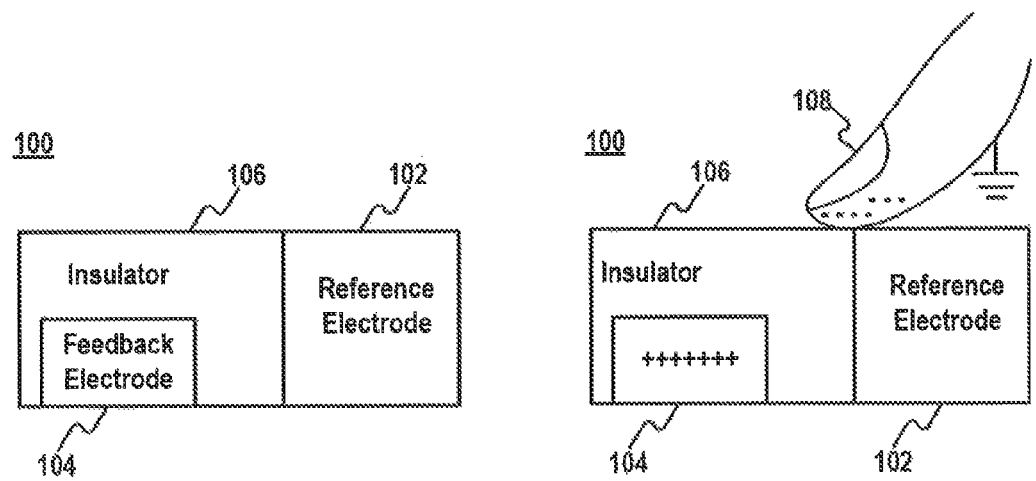
FIG. 1B is a schematic diagram illustrating an exemplary touch sensing and feedback apparatus in a feedback stage, consistent with some disclosed embodiments.

FIGS. 1A and 1B illustrate an exemplary touch sensing and feedback apparatus operating in touch sensing and touch feedback stages, respectively, consistent with some disclosed embodiments. Referring to FIG. 1A, a touch sensing and feedback apparatus 100 comprises a reference electrode 102, a feedback electrode 104, and an insulator 106 providing insulation between reference electrode 102 and feedback electrode 104. When there is no touch action occurs, apparatus 100 has a parasitic capacitance Cp between reference electrode 102 and feedback electrode 104.

When a touch action occurs, e.g., when a user's finger 108 touches the surface of apparatus 100, finger 108 and feedback electrode 104 generate a capacitor CF1 therebetween, and finger 108 and reference electrode 102 generate another capacitor CF2 therebetween. Therefore, the capacitance between feedback electrode 104 and reference electrode 102 may change due to the touch action. In addition, the self capacitance measured on feedback electrode 104 alone (or reference electrode 102 alone) may also change (e.g., with respect to a common reference point such ground or neutral). By detecting capacitance changes, a touch action can be sensed.

FIG. 1B shows the feedback stage of apparatus 100. When no touch action is sensed, no feedback driving signal is applied to feedback electrode 104. When a touch action is sensed, e.g., when a user touches his/her finger 108 on apparatus 100, a feedback driving signal is applied to feedback electrode 104, generating positive charges (as shown in FIG. 1B) on feedback electrode 104. In response, negative charges are induced in finger 108, causing the user to feel tactile feedback. When the electrical current of the feedback driving signal changes direction, negative charges can be generated on feedback electrode 104 (not shown) and positive charges can be induced in finger 108 (not shown). The amount of charges induced in finger 108 and the rate of alternation between positive and negative charges in finger 108 may determine the kind of tactile sensation felt by the user. The amount of positive/negative charges induced in finger 108 may be related (e.g., proportional) to the voltage of the feedback driving signal. The rate of alternation between positive and negative charges in finger 108 may be related to the frequency of the feedback driving signal. Therefore, by controlling the voltage and the frequency of the feedback driving signal, different tactile sensations can be produced.

In addition to the feedback driving signal, a reference driving signal may be applied to reference electrode 102 to enhance the intensity of tactile sensations. For example, a grounding or neutral reference driving signal may be applied to reference electrode 102 to maintain grounding or electrical neutral condition of reference electrode 102. Because finger 108 also touches reference electrode 102, finger 108 can be kept in grounding or electrical neutral condition while the tip portion of finger 108 experiencing induction and/or alternation of electrical charges. Comparing to a non-grounding scenario, the introduction of reference electrode 102 and reference driving signal may intensify the tactile sensation with the same voltage level of feedback driving signal, or reduce feedback driving signal voltage requirement to achieve a comparable intensity of tactile sensation.

Figure 2A:
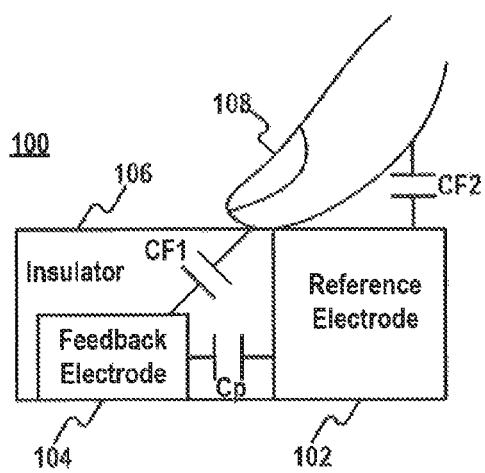
FIG. 2A is a schematic diagram illustrating an exemplary touch sensing and feedback apparatus utilizing mutual capacitive sensing, consistent with some disclosed embodiments.

FIG. 2A shows a schematic diagram illustrating an exemplary touch sensing and feedback apparatus utilizing mutual capacitive sensing, consistent with some disclosed embodiments. As used herein, mutual capacitive sensing refers to techniques of sensing a touch action based on capacitance changes between two electrodes, e.g., between a sensing electrode and a detecting electrode. Referring to FIG. 2A, when finger 108 perform a touch action, capacitor CF1 is generated between finger 108 and feedback electrode 104, and capacitor CF2 is generated between finger 108 and reference electrode 102. Therefore, capacitance between feedback electrode 104 (e.g., a sensing electrode) and reference electrode 102 (e.g., a detecting electrode) is no longer equal to Cp, which is the value before the touch action occurs. In some embodiments, reference electrode 102 may be used as a sensing electrode and feedback electrode 104 may be used as a detecting electrode. By monitoring or measuring changes of capacitance between feedback electrode 104 and reference electrode 102, the occurrence of a touch action can be detected.

Figure 2B:
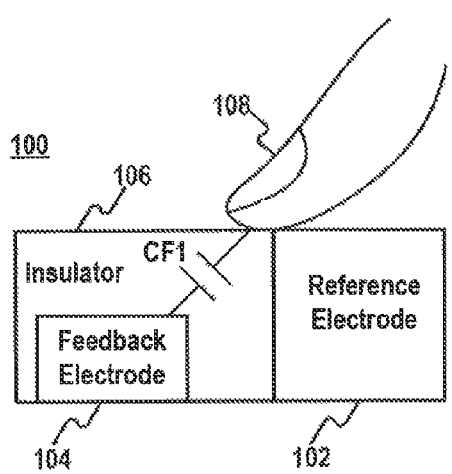
FIGS. 2B and 2C are schematic diagrams illustrating exemplary touch sensing and feedback apparatuses utilizing self capacitive sensing, consistent with some disclosed embodiments.
Figure 2C:
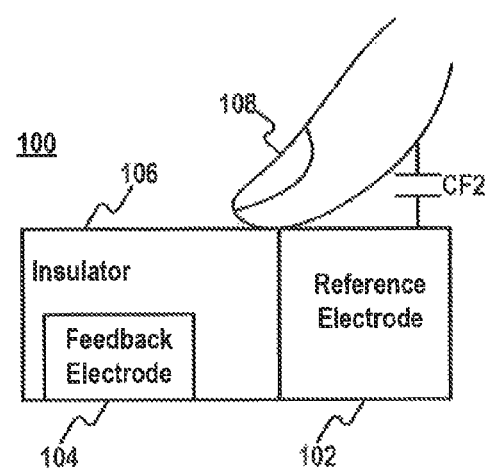

FIGS. 2B and 2C are schematic diagrams illustrating exemplary touch sensing and feedback apparatuses utilizing self capacitive sensing, consistent with some disclosed embodiments. As used herein, self capacitive sensing refers to techniques of sensing a touch action based on self capacitance changes on a single electrode. For example, in FIG. 2B, instead of measuring capacitance between feedback electrode 104 and reference electrode 102 as shown in FIG. 2A, the self capacitance of feedback electrode 104 can be used as an indicator while a touch action occurs. In some embodiments, the self capacitance of feedback electrode 104 may be measured with respect to a common point (e.g., ground or neutral), and the value of the self capacitance may be related to CF1. In FIG. 2C, the self capacitance of reference electrode 102 may be measured and used as an indicator, which value may be related to CF2.

Figure 3A:
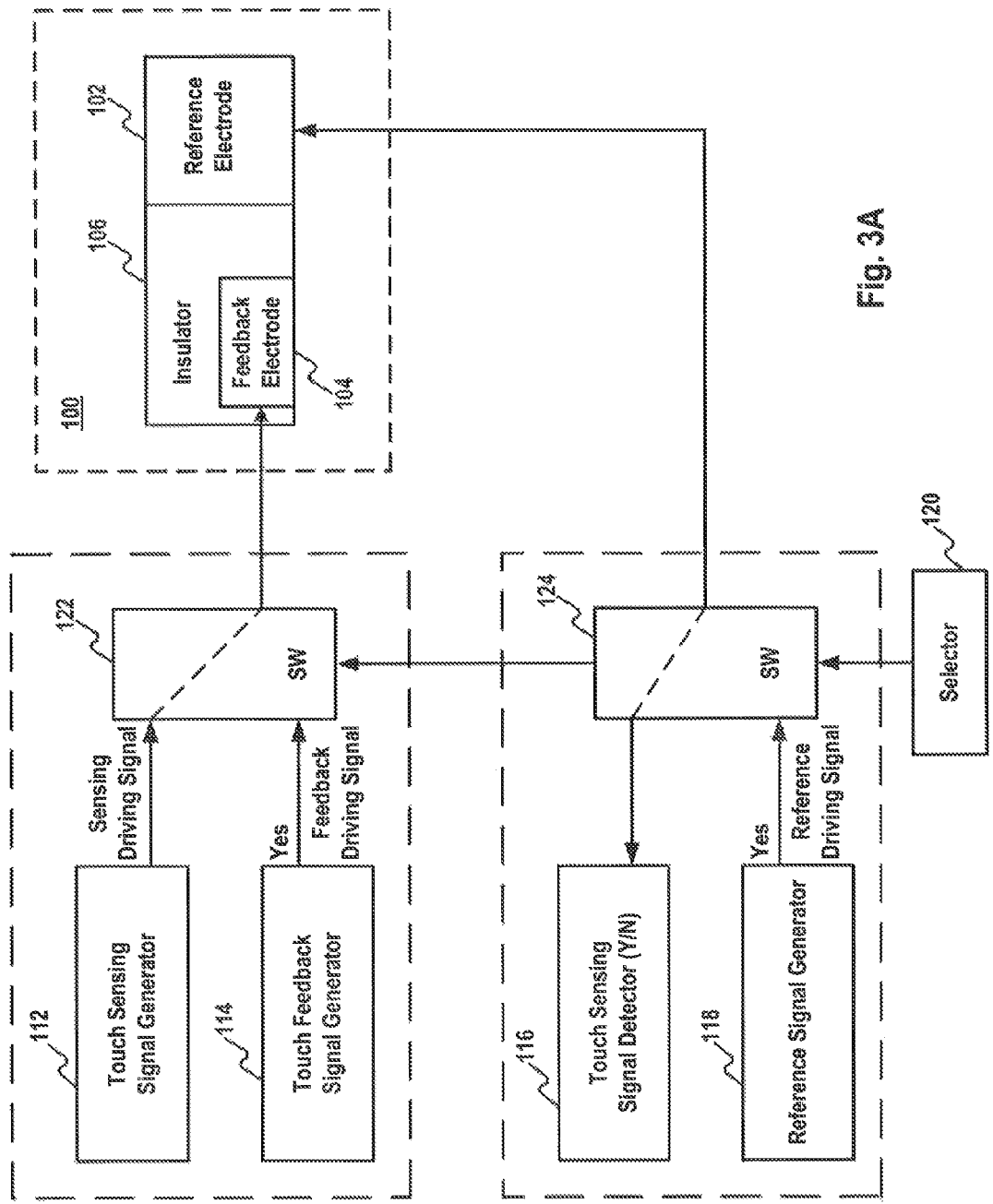
FIGS. 3A and 3B are schematic diagrams illustrating exemplary touch sensing and feedback apparatuses utilizing mutual capacitive sensing, consistent with some disclosed embodiments.

FIG. 3A is a schematic diagram illustrating an embodiment utilizing mutual capacitive sensing. In FIG. 3A, a touch sensing signal generator 112 generates a sensing driving signal and transmits the sensing driving signal to feedback electrode 104 (e.g., used as a sensing electrode) through a switch 122. Touch sensing signal generator may include any signal generators and/or signal sources suitable to generate electrical signals, such as voltage sources, current sources, function generators, pitch generators, arbitrary waveform generators, digital pattern generators, frequency generators, etc. The sensing driving signal may include sinusoidal wave signals, square wave signals, triangular wave signals, or any other repeating or non-repeating electronic signals in either analog or digital domains. Switch 122 may include analog or digital switching devices such as multiplexers. A touch sensing signal detector 116 is coupled to reference electrode 102 (e.g., used as a detecting electrode) through a second switch 124 to detect the sensing driving signal that is applied to feedback electrode 104. It is noted that the sensing driving signal detected on reference electrode 102 may not be the same as the sensing driving signal applied to feedback electrode 104 due to, for example, impedance between feedback electrode 104 and reference electrode 102 (e.g., impedance relates to resistance and capacitance between the two electrodes). From the detected sensing driving signal, touch sensing signal detector 116 may detect capacitance changes between feedback electrode 104 and reference electrode 102, and determine if there is a touch action occurs based on the capacitance changes. The determination can be achieved by analog electrical switching based on, for example, whether the detected signal or variations thereof reach a predetermined threshold. The determination can also be achieved by digital signal processing, e.g., using either an integrated controller/processor or an external controller/processor coupled thereto. A touch action signal (e.g., YES or NO) can be generated indicating if a touch action occurs based on the determination.

The touch action signal may be received by a touch feedback signal generator 114, a reference signal generator 118, and/or a selector 120. Selector 120 may be coupled to switches 122 and 124 to control their signal transmitting channels. For example, selector 120 may control switch 122 to switch its signal transmitting channel from touch sensing signal generator 112 to touch feedback signal generator 114, and control switch 124 to switch its signal transmitting channel from touch sensing signal detector 116 to reference signal generator 118, upon receiving a YES touch action signal from touch sensing signal detector 116 indicating that a touch action occurs. Touch feedback signal generator 114 may then generate a feedback driving signal and transmit the feedback driving signal to feedback electrode 104 through switch 122. Reference signal generator 118 may generate a reference driving signal and transmit the reference driving signal to reference electrode 102 through switch 124. The feedback driving signal may include electrical signals having predetermined voltage and frequency that cause a certain tactile sensation. The reference driving signal may be configured to maintain reference electrode 102 in an electrically grounding condition (e.g., connecting reference electrode to ground) to enhance the intensity of the feedback tactile sensation.

In FIG. 3A, touch sensing signal generator 112, touch feedback signal generator 114 and switch 122 are grouped together by a dashed-line box, indicating that these three components may be optionally integrated into a single device. Touch sensing signal detector 116, reference signal generator 118, and switch 124 may be optionally integrated into a single device, and touch sensing and feedback apparatus 100, including feedback electrode 104, reference electrode 102, and insulator 106, may be optionally integrated into a single device. In some embodiments, the components shown in FIG. 3A may be separated devices or may be grouped or integrated in other manners. Therefore, it is noted that the grouping using dashed-line boxes shown in FIG. 3A is just one example of many possible implementations, and should not be considered as a limitation of the scope of the disclosure. The dashed-line boxes shown in other figures are also for exemplary purposes only.

Figure 3B:
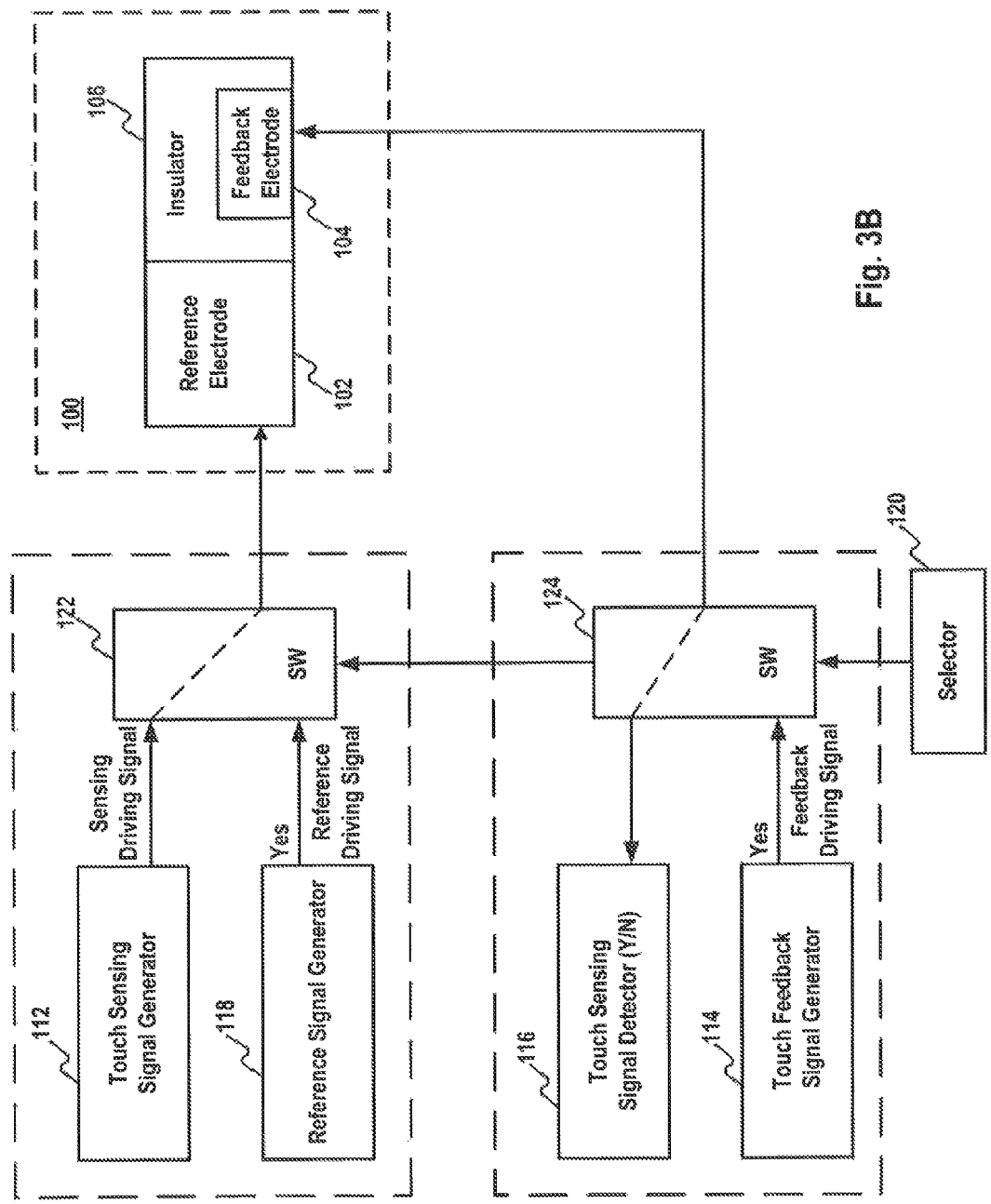

FIG. 3B is a schematic diagram illustrating another embodiment utilizing mutual capacitive sensing. In FIG. 3B, reference electrode 102 is used as the sensing electrode to which the sensing driving signal generated by touch sensing signal generator 112 is transmitted, whereas feedback electrode 104 is used as the detecting electrode coupled the touch sensing signal detector 116 through switch 124. After touch sensing signal detector 116 detects a touch action, touch sensing signal detector 116 generates a touch action signal and selector 120 controls switches 122 and 124 to switch signal transmitting channels based on the touch action signal. Reference signal generator 118 transmits a reference driving signal to reference electrode 102 and touch feedback signal generator transmits a feedback driving signal to feedback electrode 104 to provide touch feedback.

Figure 4A:
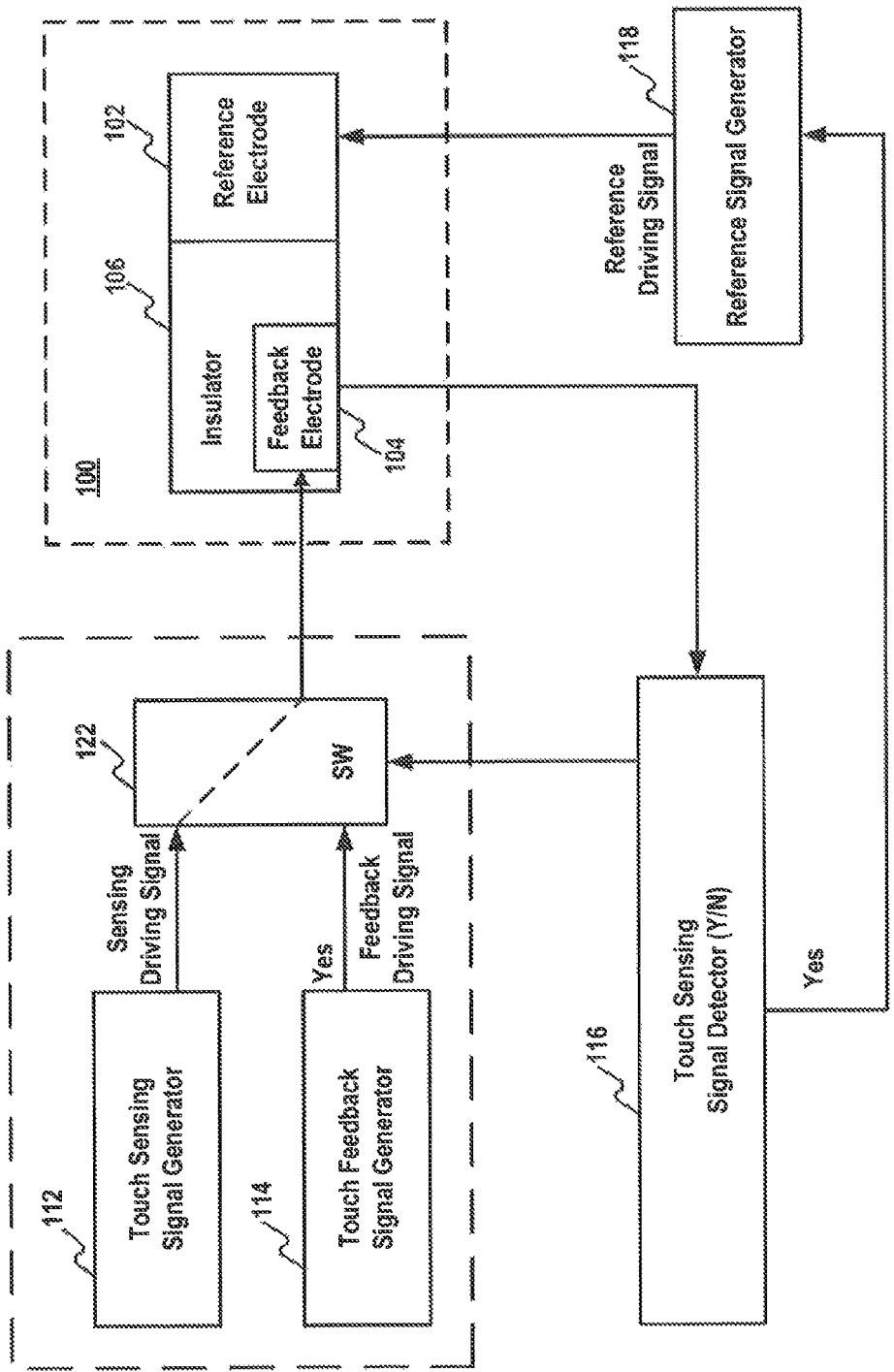
FIGS. 4A and 4B are schematic diagrams illustrating exemplary touch sensing and feedback apparatuses utilizing self capacitive sensing, consistent with some disclosed embodiments.

FIG. 4A is a schematic diagram illustrating an embodiment utilizing self capacitive sensing. In FIG. 4A, touch sensing signal detector 116 is coupled to feedback electrode 104 to detect the self capacitance of feedback electrode 104 when the sensing driving signal is applied to feedback electrode 104 (e.g., feedback electrode 104 is used as both a sensing electrode and a detecting electrode). Based on the changes of self capacitance of feedback electrode 104, touch sensing signal detector generates a touch action signal. Based on the touch action signal, touch feedback signal generator 114 generates a feedback driving signal and transmits the feedback driving signal to feedback electrode 104 through switch 122 (with its signal transmitting channel switched), and reference signal generator 118 generates a reference driving signal and transmits the reference driving signal to reference electrode 102.

Figure 4B:
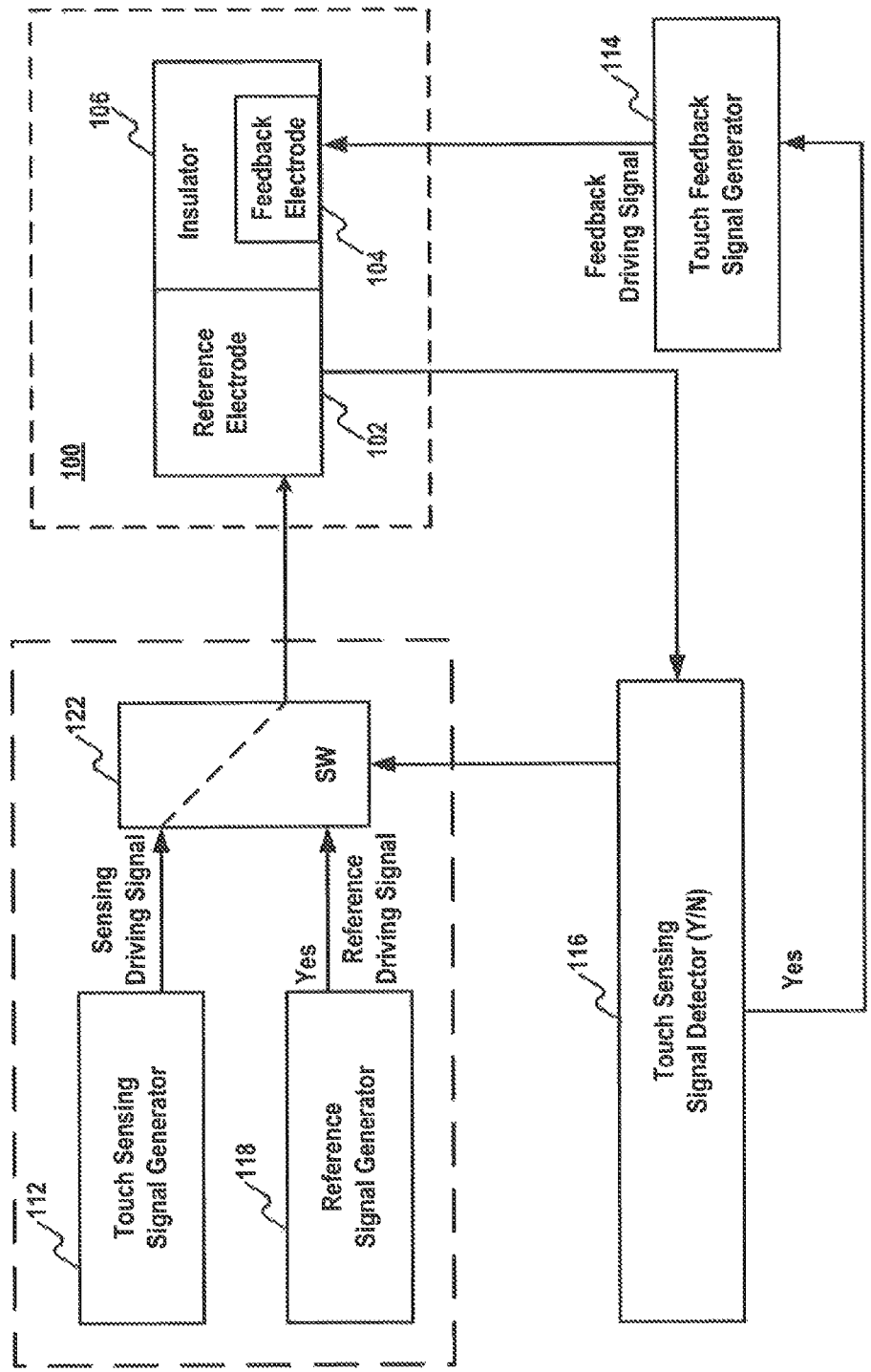

FIG. 4B is a schematic diagram illustrating another embodiment utilizing self capacitive sensing. In FIG. 4B, touch sensing signal detector 116 is coupled to reference electrode 102 to detect the self capacitance of reference electrode 102 when the sensing driving signal is applied to reference electrode 102 (e.g., reference electrode 102 is used as both a sensing electrode and a detecting electrode). Based on the changes of self capacitance of reference electrode 102, touch sensing signal detector generates a touch action signal. Based on the touch action signal, reference signal generator 118 generates a reference driving signal and transmits the reference driving signal to reference electrode 102 through switch 122 (with its signal transmitting channel switched), and touch feedback signal generator 114 generates a feedback driving signal and transmits the feedback driving signal to feedback electrode 104.

FIG. 5 is a schematic diagram illustrating an embodiment utilizing two feedback electrodes. In FIG. 5, a touch sensing and feedback apparatus 500 includes a reference electrode 102, an insulator 106, and two feedback electrodes 104a and 104b. Feedback electrode 104a is used as a sensing electrode and feedback electrode 104b is used as a detecting electrode. In touch sensing phase, touch sensing signal generator 112 generates a sensing driving signal and transmits the sensing driving signal to feedback electrode 104a through switch 122, and touch sensing signal detector 116, which is coupled to feedback electrode 104b, detects mutual capacitance between feedback electrodes 104a and 104b based on signal detected on feedback electrode 104b. Once a touch action is detected, two touch feedback signal generators 114a and 114b generate feedback driving signals to transmit to feedback electrodes 104a and 104b, respectively. And reference signal generator 118 generates and transmits reference driving signal to reference electrode 102.

Figure 6:
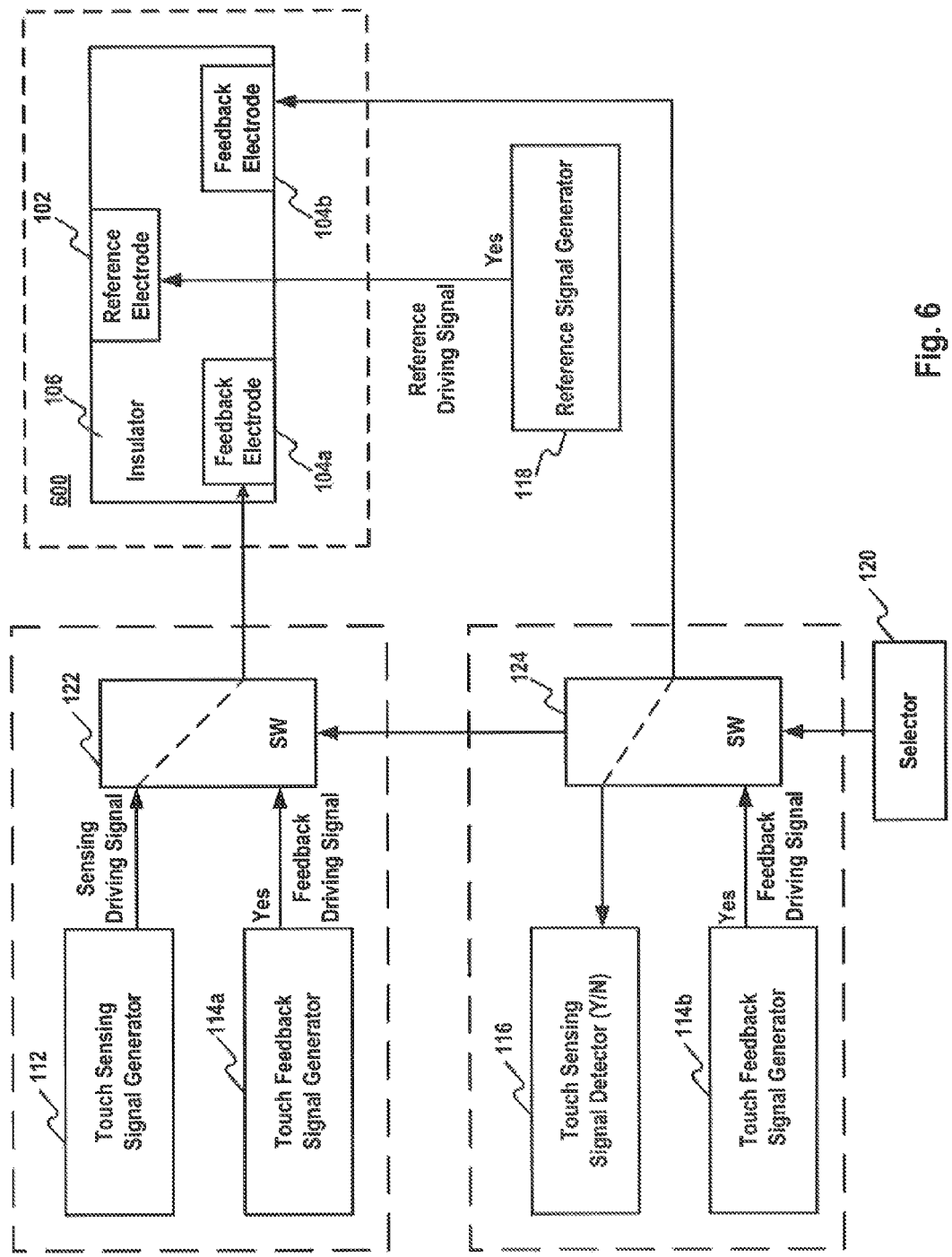

FIG. 6 is a schematic diagram illustrating another embodiment utilizing two feedback electrodes. Compared to FIG. 5, FIG. 6 shows a touch sensing and feedback apparatus 600 in which two feedback electrodes 104a and 104b are arranged in the bottom left and bottom right portions of apparatus 600, respectively, whereas reference electrode 102 is arranged in the central top portion of apparatus 600. Other components in FIG. 6 are similar to those of FIG. 5.

Figure 7:
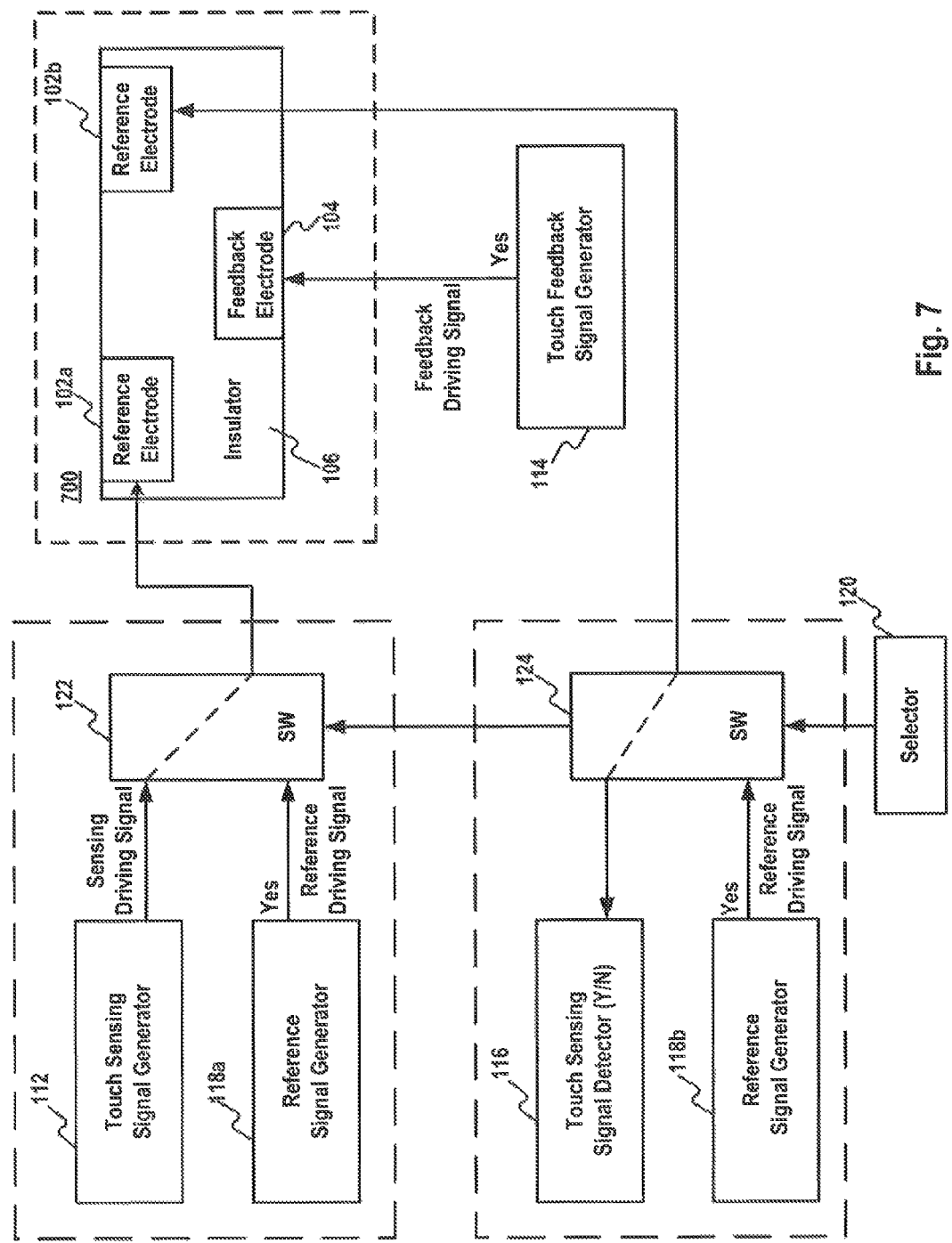

FIG. 7 is a schematic diagram illustrating an embodiment utilizing two reference electrodes. Compared to FIG. 6, FIG. 7 shows a touch sensing and feedback apparatus 700 in which two reference electrodes 102a and 102b are arranged on the top left and top right portions of apparatus 700, respectively, whereas feedback electrode 104 is arranged in the central bottom portion of apparatus 700. In FIG. 7, the mutual capacitance being detected is the mutual capacitance between the two reference electrodes 102a and 102b. For example, reference electrode 102a is used as a sensing electrode that receives the sensing driving signal from touch sensing signal generator 112, and reference electrode 102b is used as a detecting electrode coupled to touch sensing signal detector 116. Other components in FIG. 7 are similar to those of FIGS. 5 and 6.

Figure 8:
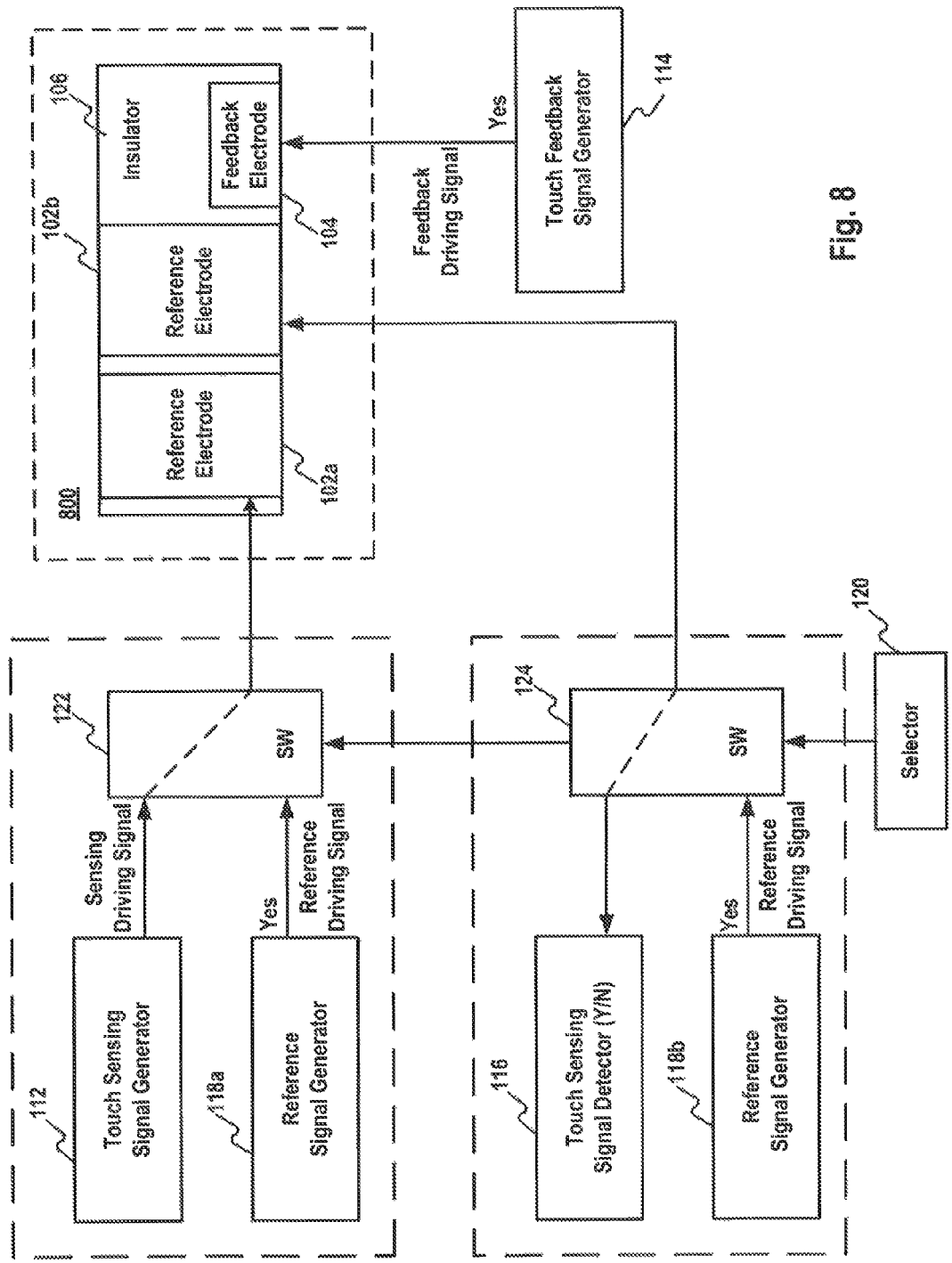

FIG. 8 is a schematic diagram illustrating another embodiment utilizing two reference electrodes. FIG. 8 shows a touch sensing and feedback apparatus 800 in which two reference electrodes 102a and 102b are arranged on the left side of apparatus 800, whereas feedback electrode 104 is arranged on the right side of apparatus 800. Apparatus 800 can also be seen as apparatus 100 with an additional reference electrode. Other components in FIG. 8 are similar to those of FIG. 7.

Although only two feedback electrodes (e.g., FIGS. 5 and 6) or only two reference electrodes (e.g., FIGS. 7 and 8) are shown in the above figures. Any number of feedback/reference electrodes can be integrated into a touch sensing and feedback apparatus.

Figure 9:
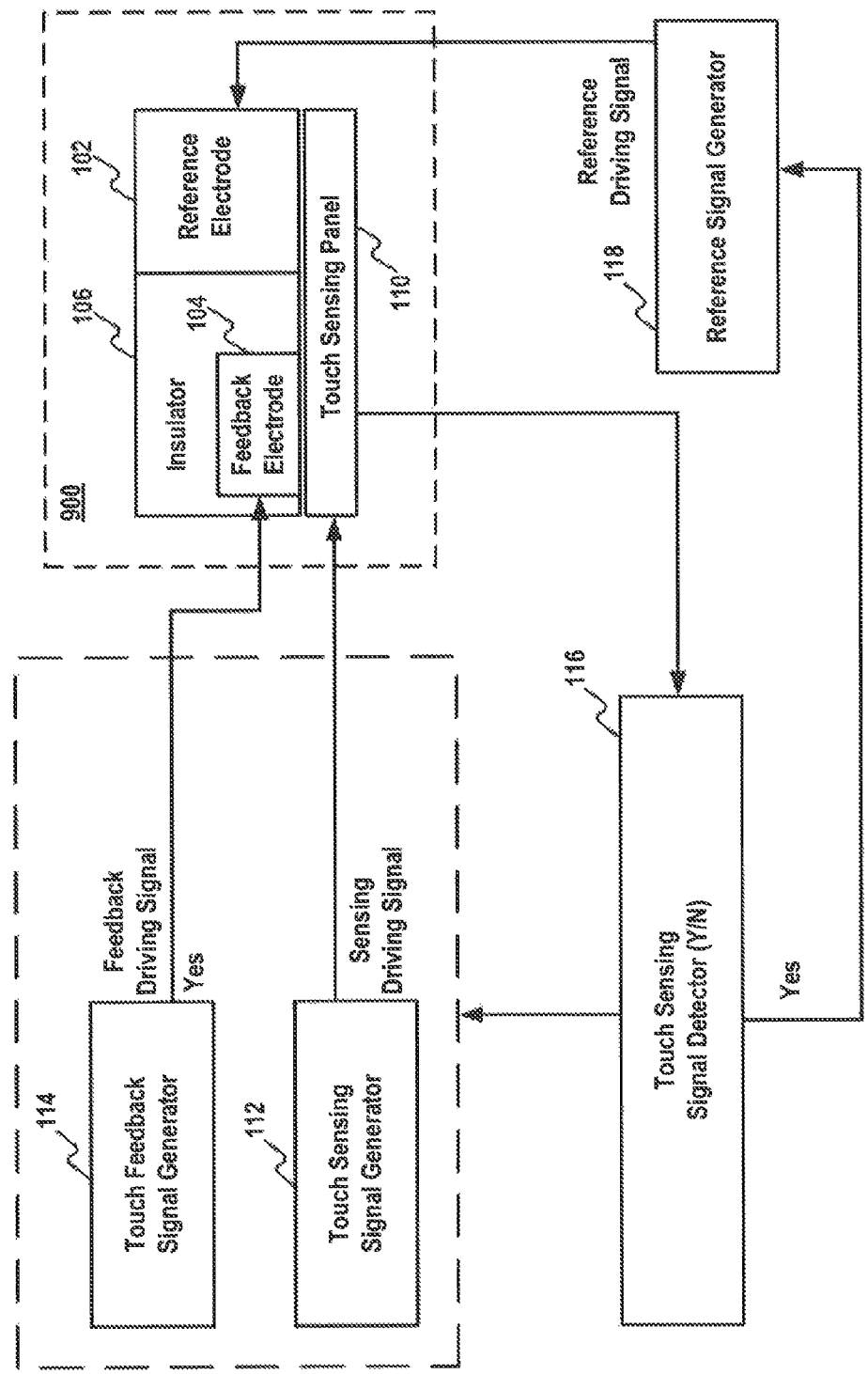

FIG. 9 is a schematic diagram illustrating an embodiment utilizing a touch sensing panel. In FIG. 9, a touch sensing and feedback apparatus 900 includes a feedback portion similar to apparatus 100 and a sensing portion comprising a touch sensing panel 110. Touch sensing panel 110 is used to implement touch action detection function. For example, touch sensing signal generator 112 generates a sensing driving signal and transmits to touch sensing panel 110. Touch sensing signal detector 116 coupled to touch sensing panel 110 detects if there is any touch action occurs based on detected sensing driving signal. Once a touch action is detected, touch feedback signal generator 114 generates a feedback driving signal and transmits to feedback electrode 104, and reference signal generator 118 generates a reference driving signal and transmits to reference electrode 102.

FIG. 10 is a schematic diagram illustrating another embodiment utilizing a touch sensing panel. Compared to FIG. 9, FIG. 10 shows a touch sensing and feedback apparatus 1000 in which touch sensing panel 110 is arranged on the left side of apparatus 1000. Other components in FIG. 10 are similar to those of FIG. 9.

FIG. 11 is a schematic diagram illustrating an exemplary touch sensing and feedback apparatus. FIG. 11 shows an embodiment in which feedback electrode 104 is embedded into insulator 106. It is noted that feedback electrode 104 can be entirely or partially embedded into insulator 106, or attached to a surface of insulator 106, or arranged in any other manner, as long as feedback electrode 104 is electrically insulated from reference electrode 102. In some embodiments, feedback electrode 104 can be covered by a layer of insulation material to be insulated from reference electrode 102. Reference electrode 102 can be arranged in any manner, as long as at least a portion thereof can be touched by a user. In some embodiments, at least a portion of reference electrode 102 is not covered by insulation material and exposed.

Figure 12C:
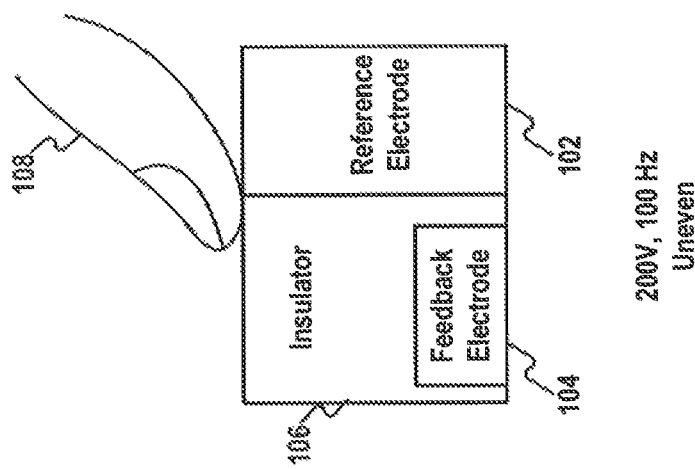
FIGS. 12A-12C are schematic diagrams illustrating exemplary touch sensing and feedback apparatuses implementing different tactile feedbacks, consistent with some disclosed embodiments.
Figure 12B:
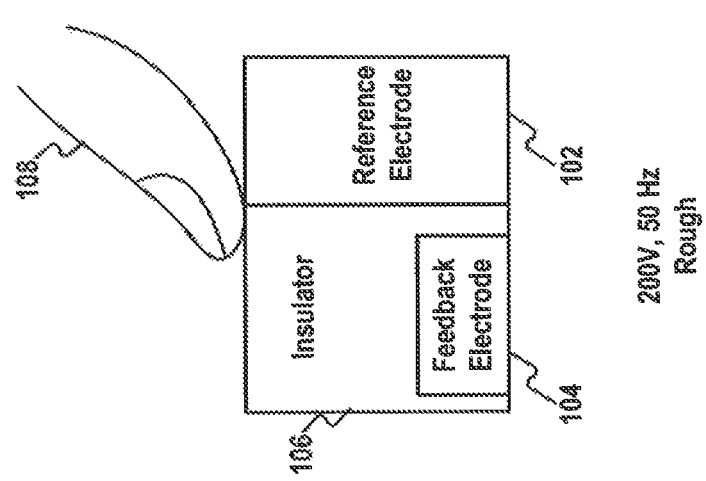
Figure 12A:
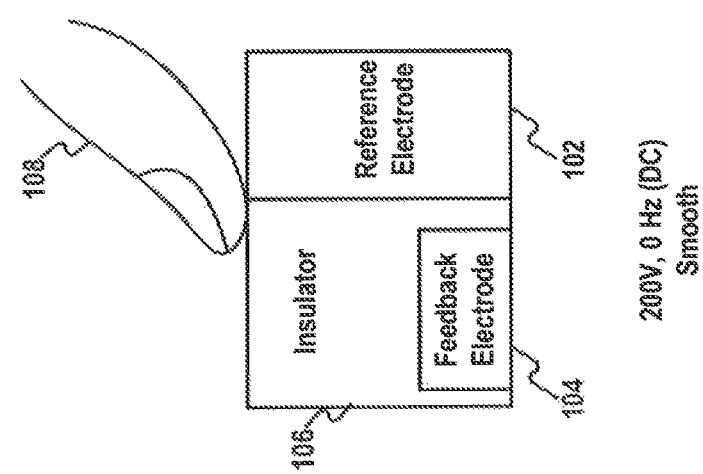

FIGS. 12A-12C are schematic diagrams illustrating exemplary touch sensing and feedback apparatuses implementing different tactile feedbacks, consistent with some disclosed embodiments. FIG. 12A shows a scenario in which a feedback causes the surface of the apparatus to feel smooth. In this example, the feedback driving signal has a voltage of 200 V and a frequency of 0 Hz (e.g., DC voltage). FIG. 12B shows a feedback that causes the surface of the apparatus to feel rough. In this example, the feedback driving signal has a voltage of 200 V and a frequency of 50 Hz. FIG. 12C shows a feedback that causes the surface of the apparatus. In this example, the feedback driving signal has a voltage of 200 V and a frequency of 100 Hz. In some embodiments, feedback driving signals may have a frequency range from 10 Hz to 20 KHz. In some embodiments, reference driving signals may have a frequency range from 0 Hz (DC) to 500 MHz, in some embodiments, sensing driving signals may have a frequency range from 1 kHz to 500 MHz. Other voltage levels and frequencies may also be used to generate different tactile sensations.

FIG. 13 is a schematic diagram illustrating exemplary operation stages of a touch sensing and feedback apparatus, consistent with some disclosed embodiments. In FIG. 13, a touch sensing and feedback apparatus comprising feedback electrode 104, reference electrode 102, and insulator 106 may have three operations stages. The stage shown on upper left corner is a sensing stage, in which sensing driving signal is ON and touch sensing signal detector detects the sensing driving signal through either mutual capacitance or self capacitance. The stage shown on upper right corner is a feedback stage, in which sensing driving signal is OFF (e.g., due to switching of signal transmitting channel) and feedback signal (including feedback driving signal and reference driving signal) is ON. The transition from the sensing stage to the feedback stage may be based on a touch action signal generated by touch sensing signal detector 116. The stage in the lower portion of FIG. 13 is a stage in which both sensing signal and feedback signal are OFF. This stage may be a transitional stage from the feedback stage to the sensing stage and may be last for a period of time. FIG. 14A is a schematic diagram illustrating an exemplary touch sensing and feedback panel 1400, consistent with some disclosed embodiments. Panel 1400 may include a plurality of electrodes arranged in a two-dimensional array. As shown in FIG. 14A, the electrodes may be in diamond shape and connected in rows or columns. Electrodes connected in a row by connectors X1, X2, X3 . . . are X electrodes 1402, whereas electrodes connected in a column by connectors Y1, Y2, Y3 . . . are Y electrodes 1404.

Figure 14B:
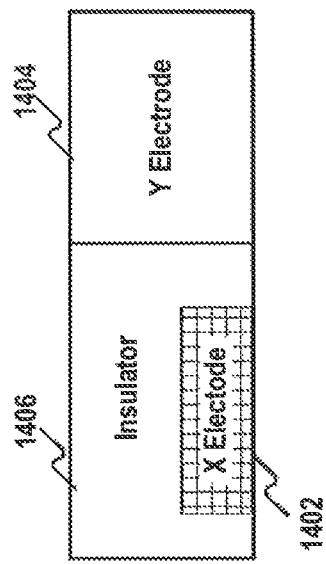
FIGS. 14B and 14C are schematic diagrams illustrating exemplary touch sensing and feedback units of FIG. 14A, consistent with some disclosed embodiments.
Figure 14C:
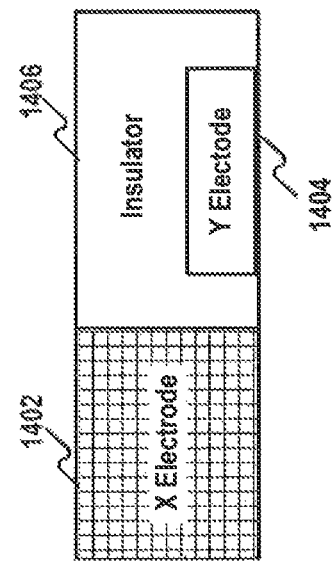
Figure 14A:
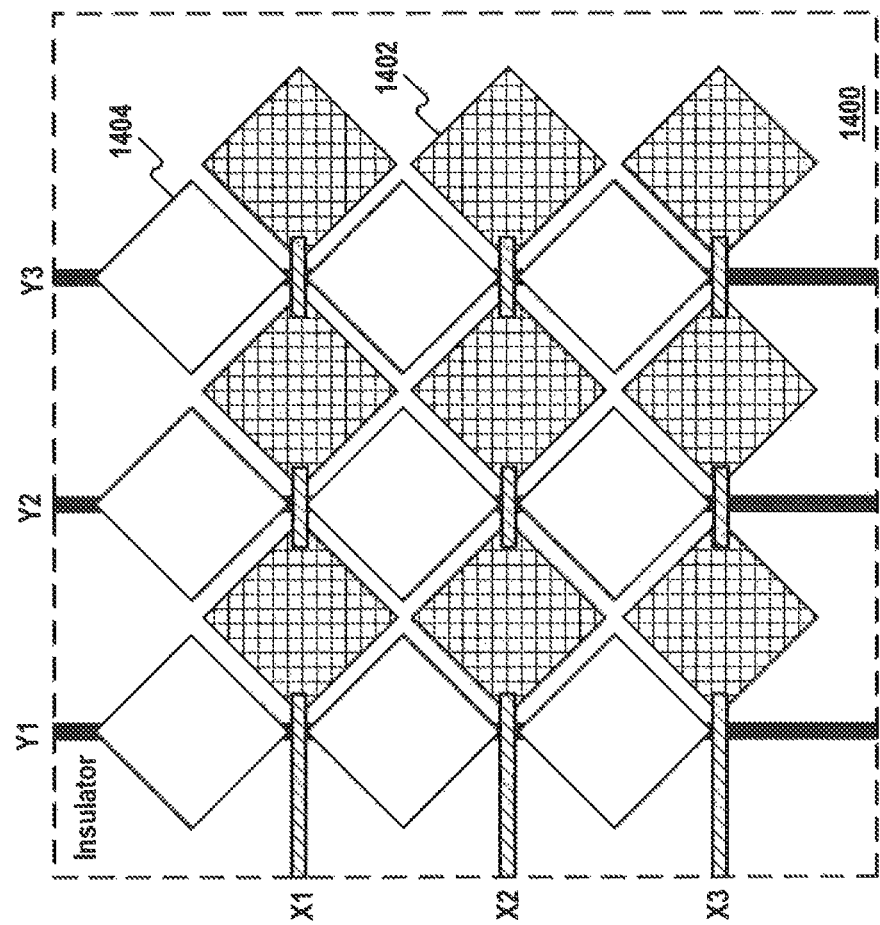
FIG. 14A is a schematic diagram illustrating an exemplary touch sensing and feedback panel, consistent with some disclosed embodiments.

FIGS. 14B and 14C are schematic diagrams illustrating exemplary touch sensing and feedback units of FIG. 14A, consistent with some disclosed embodiments. In the example shown in FIG. 14B, an X electrode 1402 is used as a feedback electrode and a Y electrode 1404 is used as a reference electrode. Therefore, Y electrode 1404 has its top surface exposed while X electrode 1402 is covered by an insulator 1406. In the example shown in FIG. 14C, Y electrode 1404 is used as a feedback electrode and X electrode 1402 is used as a reference electrode. Therefore, X electrode 1402 has its top surface exposed while Y electrode 1404 is covered by insulator 1406. For either of the embodiment shown in FIGS. 14B and 14C, mutual capacitive sensing technique (e.g., FIG. 3A or 3B) or self capacitive sensing technique (e.g., FIG. 4A or 4B) can be used to provide sensing driving signals, feedback driving signals, and/or reference driving signals to the X and/or Y electrodes.

Figure 15B:
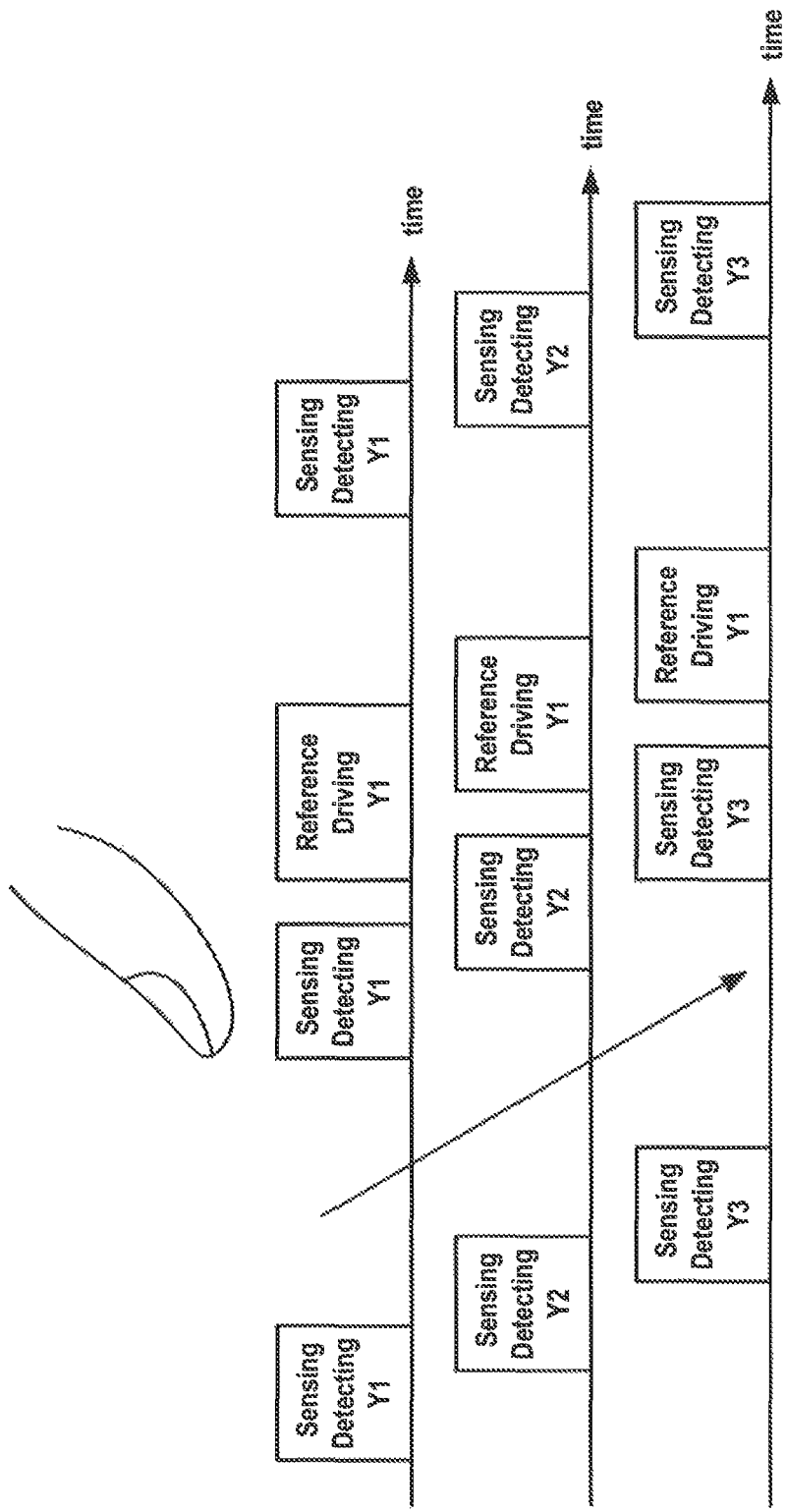

FIG. 15A shows an exemplary signal of applying sensing driving signals and feedback driving signals to X electrodes 1402 (e.g., FIG. 14B) in a touch sensing and feedback panel (e.g., FIG. 14A), consistent with some disclosed embodiments. FIG. 15B shows a corresponding signal sequence of detecting the applied sensing driving signals and applying reference driving signals to Y electrodes 1404 (e.g., FIG. 14B) in the touch sensing and feedback panel (e.g., FIG. 14A), consistent with some disclosed embodiments. The touch sensing and feedback panel (e.g., panel 1400) may comprise a plurality of touch sensing and feedback units (e.g., X electrodes 1402) and a plurality of reference units (e.g., Y electrodes 1404) that are arranged in rows (e.g., X1, X2, X3 . . . in FIG. 14A) and columns (e.g., Y1, Y2, Y3 . . . in FIG. 14A). In FIG. 15A, touch sensing driving signals may be generated by one or more touch sensing driving signal generators and transmitted to the plurality of touch sensing and feedback units. Take panel 1400 for example, touch sensing driving signals can be applied X electrodes row by row. As shown in FIG. 15A, touch sensing driving signals are first applied to the first row X1, then to the second row X2, then to the third row X3 . . . . Rows have been signaled, another cycle may begin and the signal application will repeat. As shown in FIG. 15B, reference electrodes Y1, Y2, Y3 . . . may be used to detect the applied sensing driving signals column by column. Once a touch action is detected, a corresponding touch action signal can be generated indicating that one or more units are being touched. Therefore, a subset of units that being touched can be determined to apply feedback and reference signals. For example, in FIGS. 15A and 15B, the touch action is indicated by a finger approaching or pressing the area defined by X1-X3 and Y1-Y3. Feedback driving signals are applied to X1, X2, and X3 following the application of sensing driving signals (as shown in FIG. 15A), and reference driving signals are applied following the detection of the applied sensing driving signals (as shown in FIG. 15B). Once the touch action ends, feedback driving signals and reference driving signals are not applied following their respective sensing driving signals and detection of the sensing driving signals. In some embodiments, instead of row by row, sensing driving signals can also be applied column by column, or in any manner that can cover at least a portion of the total number of the plurality of touch sensing and feedback units. For panels with different number of rows and columns, signal can be used. The signal shown in FIGS. 15A and 15B can be referred to as inter linear signal sequences. In an inter linear signal sequence, feedback signal or reference signal is applied right after a touch action is detected followed by a touch sensing driving signal, and before the next touch sensing driving signal is applied to the same row or column.

The above description is based on mutual capacitive sensing technique (e.g., FIG. 3A or 3B). Similar signal application sequence can be used based on self capacitive sensing technique (e.g. FIG. 4A or 4B). The difference is that the detection of the applied sensing driving signals is not down by Y electrodes but by X electrodes.

Figure 16A:
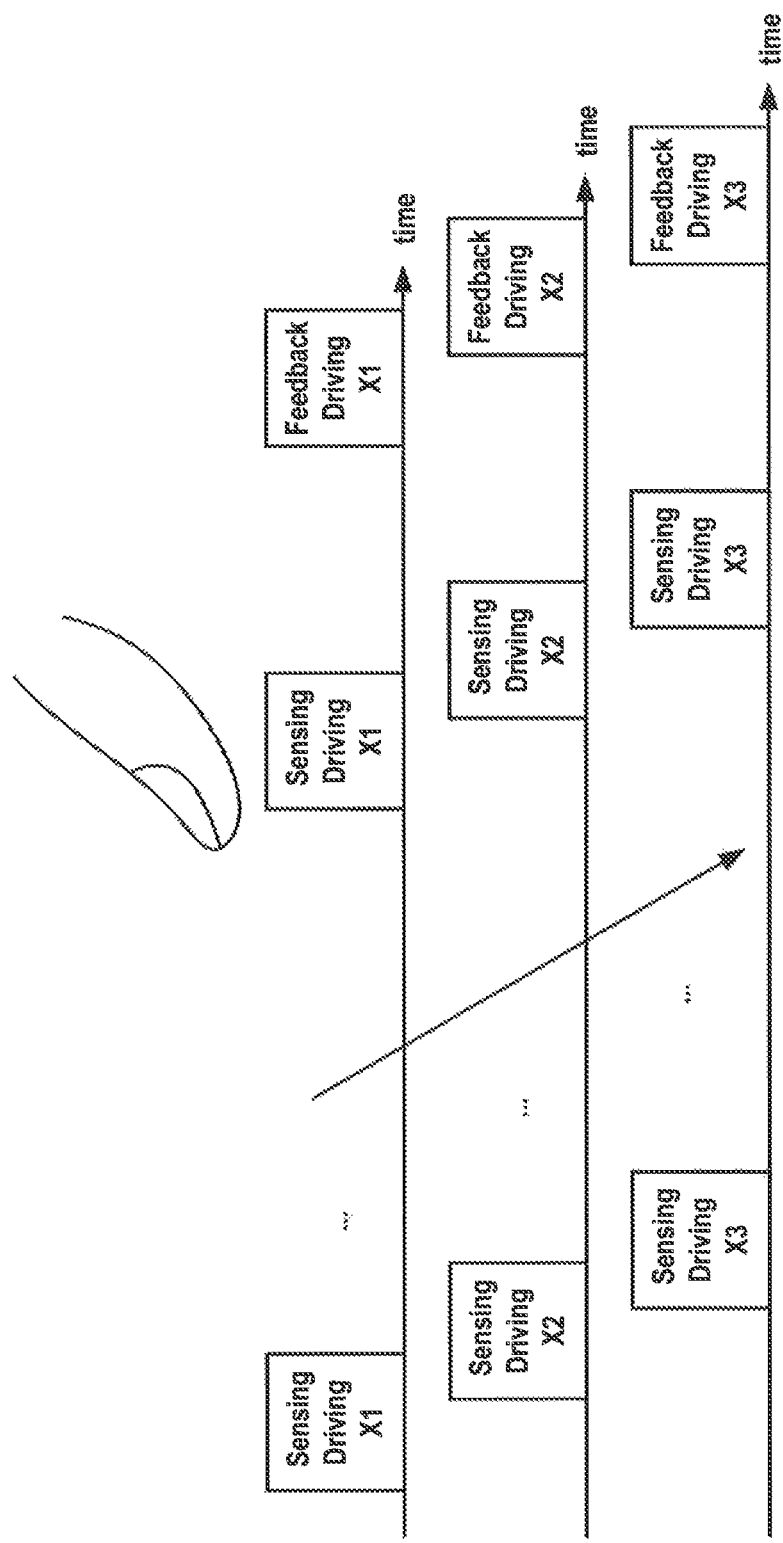
FIGS. 16A and 16B are signal sequences illustrating another exemplary method of applying sensing driving signals, feedback driving signals, and reference driving signals, consistent with some disclosed embodiments.
Figure 16B:
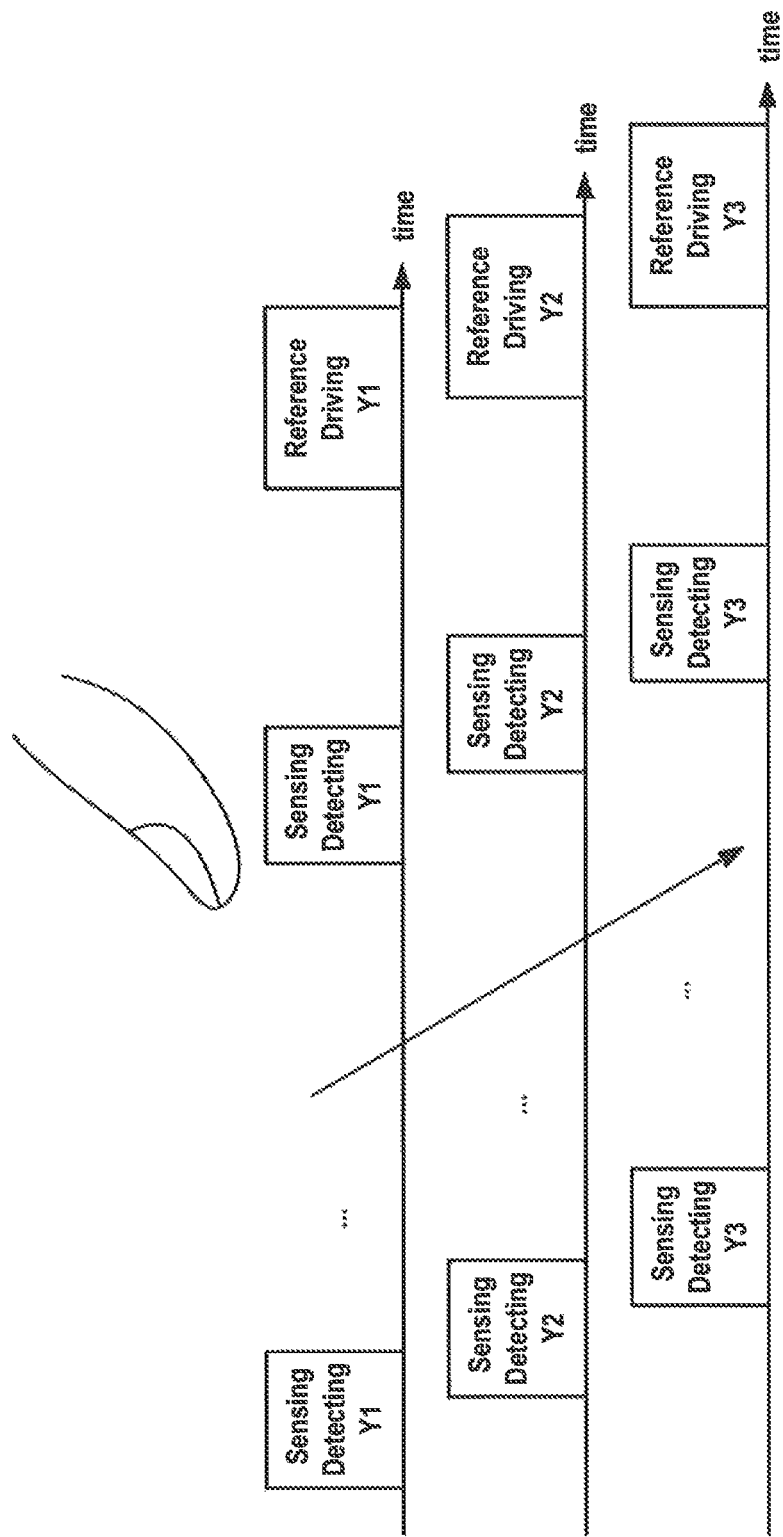

FIG. 16A shows another exemplary signal sequence of applying sensing driving signals and feedback signals to X electrodes 1402 (e.g., FIG. 14B) in a touch sensing and feedback panel (e.g., FIG. 14A), consistent with some disclosed embodiments. FIG. 16B shows a corresponding signal sequence of detecting the applied sensing driving signals and applying reference driving signals to Y electrodes 1404 (e.g., FIG. 14B) in the touch sensing and feedback panel (e.g., FIG. 14A), consistent with some disclosed embodiments. In FIG. 16A, another inter linear sequence may be used, in which one or more feedback driving signals may be applied, such as applied sequentially, after a complete cycle of sensing driving signals has been applied. As shown in FIG. 16A, feedback driving signals may be applied, such as applied sequentially, to X1, X2, and X3 after all touch sensing driving signals in the previous cycle have been applied and it is determined that the area defined by X1-X3 is touched. Similarly, in FIG. 16B, reference driving signals may be applied, such as applied sequentially, to Y1, Y2, and 13 after all Y electrodes have been scanned to detect the touch sensing driving signals and it is determined that the area defined by Y1-Y3 is touched. Compared to the inter linear method discussed above with respect to FIGS. 15A and 15B (referred herein as the inter linear method of the first kind), the inter linear method shown in FIGS. 16A and 16B (referred herein as the inter linear method of the second kind) does not apply feedback driving or reference driving signals following a corresponding row (or column) of electrodes have been signaled or scanned, wait until all rows (or columns) of electrodes have been signaled or scanned in a previous cycle before applying feedback driving or reference driving signals to the touched electrodes, and the feedback driving or reference driving signals may be applied sequentially.

The above description are based on mutual capacitive sensing technique (e.g., FIG. 3A or 3B). Similar signal application sequence can be used based on self capacitive sensing technique (e.g., FIG. 4A or 4B). The difference is that the detection of the applied sensing driving signals is not down by Y electrodes but by X electrodes.

Figure 17B:
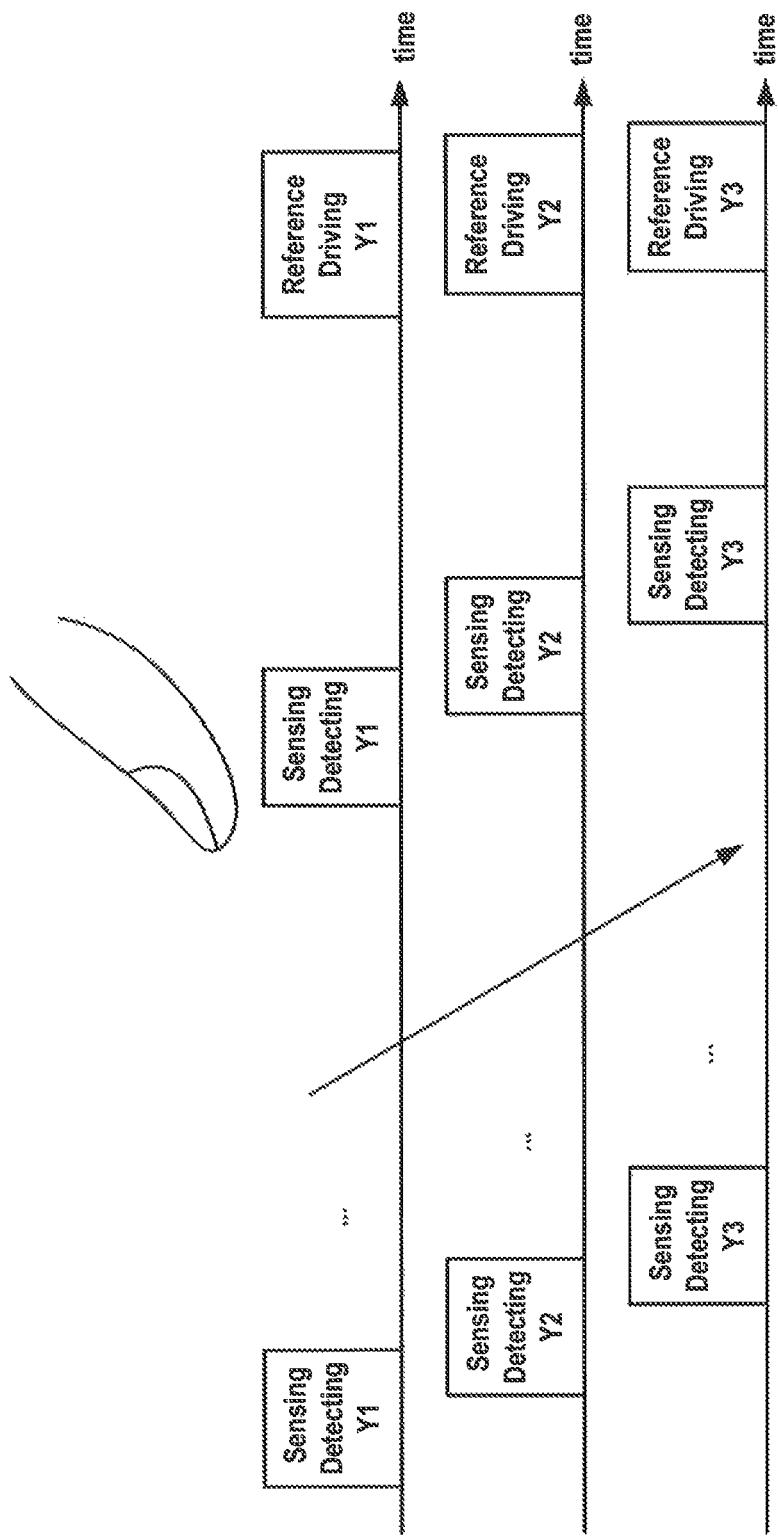

FIG. 17A shows yet another exemplary signal sequence of applying sensing driving signals and feedback signals to X electrodes 1402 (e.g., FIG. 14B) in a touch sensing and feedback panel (e.g., FIG. 14A), consistent with some disclosed embodiments. FIG. 17B shows a corresponding signal sequence of detecting the applied sensing driving signals and applying, reference driving signals to Y electrodes 1404 (e.g., FIG. 14B) in the touch sensing and feedback panel (e.g., FIG. 14A), consistent with some disclosed embodiments. In FIG. 17A, an inter frame sequence may be used, in which one or more feedback driving signals may be applied simultaneously after a complete cycle of sensing driving signals has been applied. As shown in FIG. 17A, feedback driving signals are applied simultaneously after all touch sensing driving signals in the previous cycle have been applied and it is determined that the area defined by X1-X3 is touched. Similarly, in FIG. 17B, reference driving signals are applied simultaneously to Y1, Y2, and Y3 after all Y electrodes have been scanned to detect the touch sensing driving signals and it is determined that the area defined by Y1-Y3 is touched. Compared to the inter linear method discussed with respect to FIG. 16B, the inter frame method may apply all feedback driving or reference driving signals simultaneously, instead of applying them sequentially.

It is noted that the above description are based on mutual capacitive sensing technique (e.g., FIG. 3A or 3B). Similar signal application can be used based on self capacitive sensing technique (e.g., FIG. 4A or 4B). The difference is that the detection of the applied sensing driving signals is not down by Y electrodes but by X electrodes.

For the configuration of the X and Y electrodes shown in FIG. 14C, similar techniques can be used. It is noted that difference between FIG. 14B and FIG. 14C is that X and Y electrodes are switched.

Figure 18:
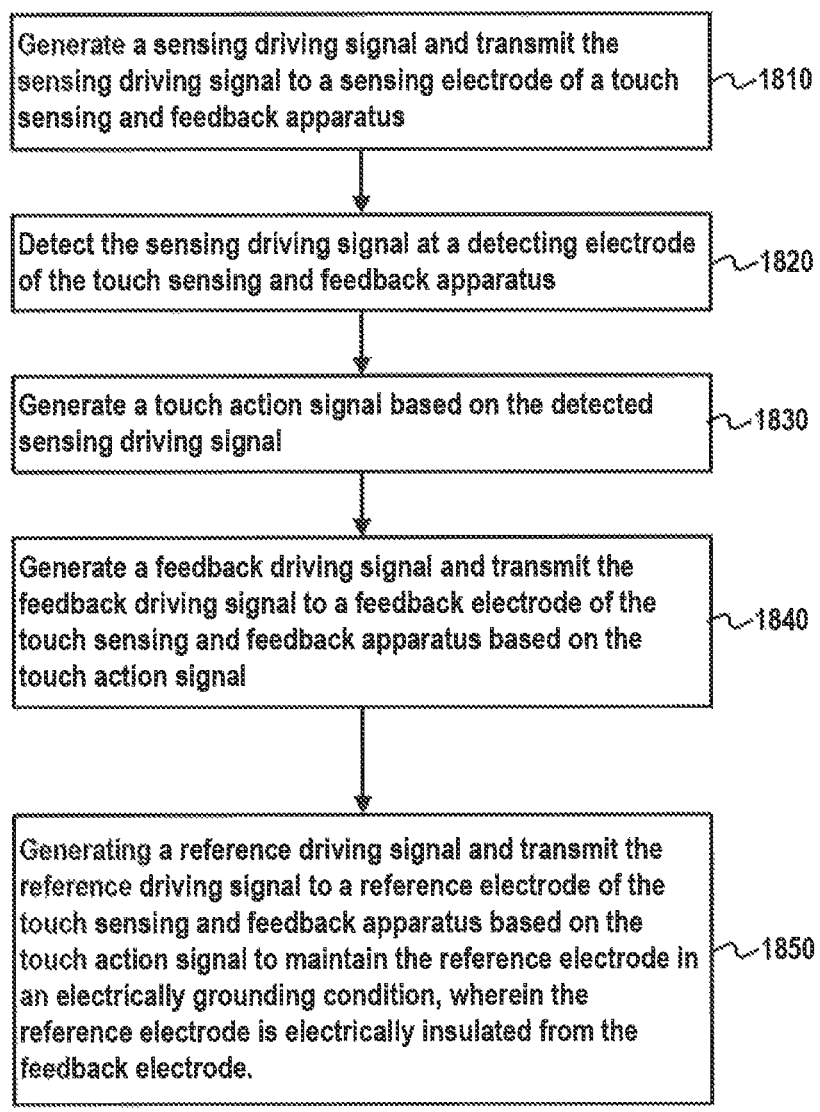
FIG. 18 is a flow chart of an exemplary method for touch sensing and feedback control, consistent with some disclosed embodiments.

FIG. 18 is a flow chart of an exemplary method for touch sensing and feedback control, consistent with some disclosed embodiments. As shown in FIG. 18, method 1800 may include a series of steps, some of them may be optional. As an example, in step 1810, method 1800 may comprise generating a sensing driving signal (e.g., by a touch sensing signal generator 112) and transmitting the sensing driving signal to a sensing electrode (e.g., feedback electrode 104 in FIG. 3A is used as a sensing electrode) of a touch sensing and feedback apparatus (e.g., apparatus 100). In one embodiment, a touch sensing signal generator may perform one or both of these steps. In step 1820, method 1800 may comprise detecting the sensing driving signal (e.g., by touch sensing signal detector 116) at a detecting electrode (e.g., reference electrode 102 in FIG. 3A is used as a detecting electrode) of the touch sensing and feedback apparatus. In one embodiment, a touch sensing signal detector may perform this step. In step 1830, method 1800 may comprising generating a touch action signal (e.g., by touch sensing signal generator 116) based on the detected sensing driving signal. In one embodiment, a touch sensing signal generator may perform this step. In step 1840, method 1800 may comprise generating a feedback driving signal (e.g, by touch feedback signal generator 114 in FIG. 3A) and transmitting the feedback driving signal to a feedback electrode (e.g., feedback electrode 104) of the touch sensing and feedback apparatus based on the touch action signal. In one embodiment, a touch feedback signal generator may perform one or both of these steps. In step 1850, method 1800 may comprise generating a reference driving signal (e.g., by reference signal generator 118 in FIG. 3A) and transmitting the reference driving signal to a reference electrode (e.g., reference electrode 102) of the touch sensing and feedback apparatus based on the touch action signal to maintain the reference electrode in an electrically grounding condition, wherein the reference electrode is electrically insulated from the feedback electrode (e.g., by insulator 106). In one embodiment, a reference signal generator may perform one or more of these steps.

Figure 19:
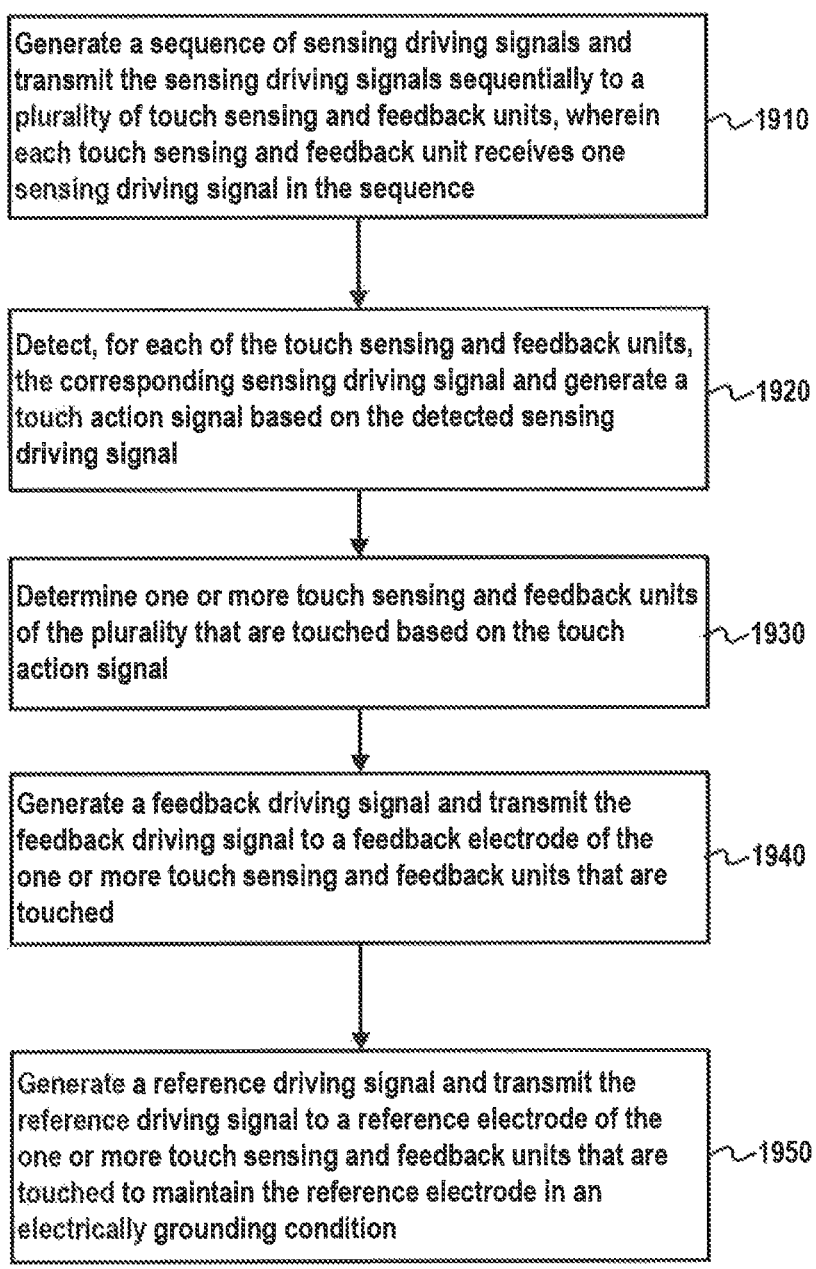
FIG. 19 is a flow chart of an exemplary method for controlling a touch sensing and feedback panel, consistent with some disclosed embodiments.

FIG. 19 is a flow chart of an exemplary method for controlling a touch sensing and feedback panel, consistent with some disclosed embodiments. As shown in FIG. 19, method 1900 may include a series of steps, some of them may be optional. As an example, in step 1910, method 1900 may comprise generating a sequence of sensing driving signals (e.g., touch sensing driving signals shown in FIG. 16A) and transmitting the sensing driving signals sequentially to a plurality of touch sensing and feedback units (e.g., touch sensing and feedback units in FIG. 15), wherein each touch sensing and feedback unit receives one sensing driving signal in the sequence. In step 1920, method 1900 may comprise detecting, for each of the touch sensing and feedback units, the corresponding sensing driving signal and generating a touch action signal based on the detected sensing driving signal. In step 1930, method 1900 may comprise determining one or more touch sensing and feedback units of the plurality that are touched based on the touch action signal. In step 1940, method 1900 may comprise generating a feedback driving signal (e.g., by touch feedback signal generator 1502) and transmitting the feedback driving signal to a feedback electrode (e.g., electrode 104 in FIG. 15) of the one or more touch sensing and feedback units that are touched. In step 1950, method 1900 may comprise generating a reference driving signal (e.g., by reference signal generator 1504) and transmitting the reference driving signal to a reference electrode (e.g., reference electrode 102 in FIG. 15) of the one or more touch sensing and feedback units that are touched to maintain the reference electrode in an electrically grounding condition.

In the foregoing descriptions, various aspects, steps, or components are grouped together in a single embodiment for purposes of illustrations. The disclosure is not to be interpreted as requiring all of the disclosed variations for the e claimed subject matter. The following claims are incorporated into this Description of the Exemplary Embodiments, with each claim standing on its own as a separate embodiment of the disclosure.

Moreover, it will be apparent to those skilled in the art from consideration of the specification and practice of the present disclosure that various modifications and variations can be made to the disclosed systems and methods without departing from, the scope of the disclosure, as claimed. Thus, it is intended that the specification and examples be considered as exemplary only, with a true scope of the present disclosure being indicated by the following claims and their equivalents.

What is claimed is:

1. A touch sensing and feedback apparatus comprising:
  a feedback electrode;
  a reference electrode electrically insulated from the feedback electrode;
  wherein the feedback electrode is covered by an insulator and the reference electrode is exposed without insulation covering;
  a signal generator to generate a sensing driving signal and transmit the sensing driving signal to a sensing electrode, wherein at least a first portion of one of the feedback electrode and the reference electrode is used as the sensing electrode; and a signal detector coupled to a detecting electrode to detect the sensing driving signal and generate a touch action signal based on the detected sensing driving signal, wherein at least a second portion of one of the feedback electrode and the reference electrode is used as the detecting electrode, wherein the signal generator:

generates a feedback driving signal and transmits the feedback driving signal to the feedback electrode based on the touch action signal; and generates a reference driving signal and transmits the reference driving signal to the reference electrode based on the touch action signal, wherein the reference driving signal maintains the reference electrode electrically-grounded.

2. The touch sensing and feedback apparatus of claim 1, wherein the sensing electrode is the same as or is electrically connected to the detecting electrode.

3. The touch sensing and feedback apparatus of claim 1, wherein the touch action signal reflects whether a user or user object touches or approaches the detecting electrode.

4. The touch sensing and feedback apparatus of claim 1, wherein the signal generator includes at least one of:

a touch sensing signal generator to generate the sensing driving signal;

a touch feedback signal generator to generate the feedback driving signal; and a reference signal generator to generate the reference driving signal.

5. The touch sensing and feedback apparatus of claim 4, wherein the signal generator includes the touch sensing signal generator and the touch feedback signal generator, and the touch sensing and feedback apparatus further comprises:

a selector coupled to the touch sensing signal generator, the touch feedback signal generator, and the feedback electrode, wherein the selector selects one of the sensing driving signal or the feedback driving signal to transmit to the feedback electrode based on the touch action signal.

6. The touch sensing and feedback apparatus of claim 4, wherein the signal generator includes the touch sensing signal generator and the reference signal generator, and the touch sensing and feedback apparatus further comprises:

a selector coupled to the touch sensing signal generator, the reference signal generator, and the reference electrode, wherein the selector selects one of the sensing driving signal or the reference driving signal to transmit to the reference electrode based on the touch action signal.

7. The touch sensing and feedback apparatus of claim 4, wherein the signal generator includes the touch feedback signal generator, and the touch sensing and feedback apparatus further comprises:

a selector coupled to the signal detector, the touch feedback signal generator, and the feedback electrode, wherein the selector, based on the touch action signal, selects one of:

the detected sensing driving signal to transmit to the signal detector; or the feedback driving signal to transmit to the feedback electrode.

8. The touch sensing and feedback apparatus of claim 4, wherein the signal generator includes the reference signal generator, and the touch sensing and feedback apparatus further comprises:

a selector coupled to the signal detector, the reference signal generator, and the reference electrode, wherein the selector, based on the touch action signal, selects one of:

the detected sensing driving signal to transmit to the signal detector; or the reference driving signal to transmit to the reference electrode.

9. A touch sensing and feedback panel comprising:

a plurality of touch sensing and feedback units arranged in an array, wherein each touch sensing and feedback unit comprises:

a feedback electrode; and a reference electrode electrically insulated from the feedback electrode;

wherein the feedback electrode is covered by an insulator and the reference electrode is exposed without insulation covering;

a signal generator to generate a sensing driving signal and transmit the sensing driving signal to each of the touch sensing and feedback units;

a signal detector coupled to each of the touch sensing and feedback units to detect the sensing driving signal and generate, for each of the touch sensing and feedback units, a touch action signal based on the detected sensing driving signal; and a controller coupled to the signal generator and the signal detector to determine one or more touch sensing and feedback units of the plurality that are touched based on the touch action signal;

wherein the controller controls the signal generator to:

generate a feedback driving signal and transmit the feedback driving signal to the feedback electrode of the one or more touch sensing and feedback units that are touched; and generate a reference driving signal and transmit the reference driving signal to the reference electrode of the one or more touch sensing and feedback units that are touched, wherein the reference driving signal is configured to maintain the reference electrode electrically-grounded.

10. The touch sensing and feedback panel of claim 9, wherein the touch action signal reflects whether a user or user object touches or approaches the corresponding touch sensing and feedback unit.

11. The touch sensing and feedback panel of claim 9, wherein the signal generator includes at least one of:

a touch sensing signal generator to generate the sensing driving signal;

a touch feedback signal generator to generate the feedback driving signal; and a reference signal generator to generate the reference driving signal.

12. A method for touch sensing and feedback control, comprising:

generating a sensing driving signal and transmitting the sensing driving signal to a sensing electrode of a touch sensing and feedback apparatus;

detecting the sensing driving signal at a detecting electrode of the touch sensing and feedback apparatus;

generating a touch action signal based on the detected sensing driving signal;

generating a feedback driving signal and transmitting the feedback driving signal to a feedback electrode of the touch sensing and feedback apparatus based on the touch action signal, wherein the feedback electrode is covered by an insulator; and generating a reference driving signal and transmitting the reference driving signal to a reference electrode of the touch sensing and feedback apparatus based on the touch action signal to maintain the reference electrode in an electrically grounding condition, wherein the reference electrode is exposed without insulation covering and is electrically insulated from the feedback electrode.

13. The method of claim 12, wherein the sensing driving signal has a frequency range from 1 kHz to 500 MHz.

14. The method of claim 12, wherein the feedback driving signal has a frequency range from 10 Hz to 2000 Hz.

15. The method of claim 12, wherein the reference driving signal has a frequency range from 0 Hz (DC) to 500 MHz.

16. A method for controlling a touch sensing and feedback panel, wherein the touch sensing and feedback panel comprises a plurality of touch sensing and feedback units, the method comprising:
   generating a sequence of sensing driving signals and transmitting the sensing driving signals to the plurality of touch sensing and feedback units, wherein each touch sensing and feedback unit receives one or more sensing driving signal;
   detecting, for each of the touch sensing and feedback units, the corresponding sensing driving signal and generating a touch action signal based on the detected sensing driving signal;
   determining one or more touch sensing and feedback units of the plurality that are touched based on the touch action signal;
   generating a feedback driving signal and transmitting the feedback driving signal to a feedback electrode of the one or more touch sensing and feedback units that are touched, wherein the feedback electrode is covered by an insulator; and
   generating a reference driving signal and transmitting the reference driving signal to a reference electrode of the one or more touch sensing and feedback units that are touched to maintain the reference electrode in an electrically grounding condition, wherein the reference electrode is exposed without insulation covering.

17. The method of claim 16, wherein the feedback driving signal and the reference driving signal are transmitted after all sensing driving signals are transmitted to a first row of touch sensing and feedback units and before a first sensing driving signal is transmitted to a first touch sensing and feedback unit of the second row that is next to the first row.

18. The method of claim 16, wherein the feedback driving signal and the reference driving signal are sequentially transmitted after all sensing driving signals are transmitted to all of the plurality of touch sensing and feedback units in a first cycle but before a next cycle.

19. The method of claim 16, wherein the feedback driving signal and the reference driving signal are transmitted substantially simultaneously after all sensing driving signals are transmitted to all of the plurality of touch sensing and feedback units in a first cycle but before a next cycle.

\* \* \* \* \*